United States Patent
Wulfe et al.

(10) Patent No.: US 11,783,178 B2
(45) Date of Patent: Oct. 10, 2023

(54) SYSTEMS AND METHODS FOR CORRIDOR INTENT PREDICTION

(71) Applicant: TOYOTA RESEARCH INSTITUTE, INC., Los Altos, CA (US)

(72) Inventors: Blake Warren Wulfe, San Francisco, CA (US); Wolfram Burgard, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 454 days.

(21) Appl. No.: 16/942,892

(22) Filed: Jul. 30, 2020

(65) Prior Publication Data
US 2022/0036173 A1  Feb. 3, 2022

(51) Int. Cl.
G06N 3/08 (2023.01)
G06N 3/044 (2023.01)
G05D 1/02 (2020.01)

(52) U.S. Cl.
CPC ............ G06N 3/08 (2013.01); G05D 1/0221 (2013.01); G05D 1/0274 (2013.01); G06N 3/044 (2023.01)

(58) Field of Classification Search
CPC .......... G06N 3/08; G06N 3/0445; G06N 3/06; G06N 3/04; G05D 1/0221; G05D 1/0274; G05D 1/021
See application file for complete search history.

(56) References Cited

U.S. PATENT DOCUMENTS

| | | | |
|---|---|---|---|
| 9,174,641 B2 | 11/2015 | Fritz et al. | |
| 10,249,196 B2 | 4/2019 | Krnja et al. | |
| 10,401,863 B2 | 9/2019 | Gao et al. | |
| 11,195,418 B1 * | 12/2021 | Hong | G06N 3/0454 |

(Continued)

FOREIGN PATENT DOCUMENTS

| | | |
|---|---|---|
| CN | 109976334 A | 7/2019 |
| CN | 106652468 B | 9/2019 |

(Continued)

OTHER PUBLICATIONS

Predicting future lane changes of other highway vehicles using RNN-based deep models (https://arxiv.org/abs/1801.04340), Accessed: May 16, 2019.

(Continued)

*Primary Examiner* — Kamran Afshar
*Assistant Examiner* — Brian J Hales
(74) *Attorney, Agent, or Firm* — DINSMORE & SHOHL LLP

(57) ABSTRACT

A method includes generating a training data set comprising a plurality of training examples, wherein each training example is generated by receiving map data associated with a road portion, receiving sensor data associated with a road agent located on the road portion, defining one or more corridors associated with the road portion based on the map data and the sensor data, extracting a plurality of agent features associated with the road agent based on the sensor data, extracting a plurality of corridor features associated with each of the one or more corridors based on the sensor data, and for each corridor, labeling the training example based on the position of the road agent with respect to the corridor, and training a neural network using the training data set.

20 Claims, 24 Drawing Sheets

(56) References Cited

U.S. PATENT DOCUMENTS

| | | | |
|---|---|---|---|
| 2018/0059670 A1 | 3/2018 | Nilsson | |
| 2018/0186378 A1* | 7/2018 | Zhuang | G05D 1/0088 |
| 2018/0281785 A1 | 10/2018 | Berntorp et al. | |
| 2018/0284785 A1* | 10/2018 | Berntorp | G06N 3/08 |
| 2019/0077398 A1 | 3/2019 | Kusano et al. | |
| 2019/0146509 A1* | 5/2019 | Dean | G06N 7/005 |
| | | | 701/25 |
| 2019/0302767 A1* | 10/2019 | Sapp | G06N 5/02 |
| 2020/0148215 A1* | 5/2020 | Mohajerin | G06N 3/08 |
| 2020/0159215 A1* | 5/2020 | Ding | G06N 3/0454 |
| 2020/0225669 A1* | 7/2020 | Silva | G06N 20/00 |

FOREIGN PATENT DOCUMENTS

| | | |
|---|---|---|
| CN | 110427850 A | 11/2019 |
| CN | 110675632 A | 1/2020 |
| WO | 2018063250 A1 | 4/2018 |
| WO | 2020015888 A | 1/2020 |

OTHER PUBLICATIONS

Advanced adaptive cruise control based on operation characteristic estimation and trajectory prediction (https://www.mdpi.com/2076-3417/9/22/4875/htm), Accessed: Nov. 14, 2019.

\* cited by examiner

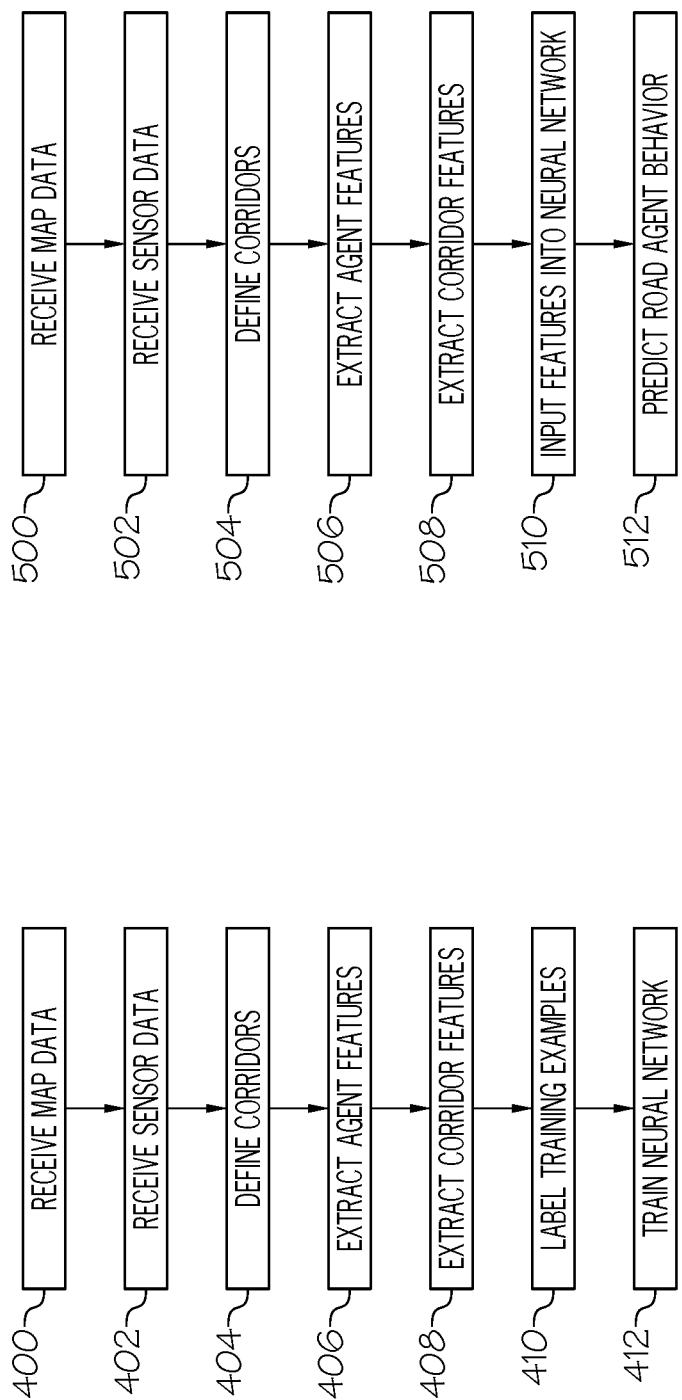

SYSTEMS AND METHODS FOR CORRIDOR INTENT PREDICTION

TECHNICAL FIELD

The present specification relates to modeling of road behavior, and more particularly, to systems and methods for corridor intent prediction.

BACKGROUND

Autonomous vehicles must navigate a variety of driving environments. In particular, autonomous vehicles must be aware of other vehicles on the road. When driving along a multi-lane road, in which there are vehicles in one or more adjacent lanes, a vehicle in an adjacent lane may change lanes in front of the autonomous vehicle, which may necessitate the autonomous vehicle adjusting its driving behavior (e.g., quickly braking to avoid a collision). If the autonomous vehicle is able to predict when vehicles in adjacent lanes will change lanes, the autonomous vehicle be able to adjust its driving behavior earlier (e.g., slowing down gradually), thereby providing a better driving experience for passengers. Thus, there is a need for alternative autonomous vehicles that predict when vehicles in adjacent lanes will change lanes and cut in front of an autonomous vehicle.

SUMMARY

In one embodiment, a method may include generating a training data set comprising a plurality of training examples and training a neural network using the training data set. Each training example may be generated by receiving map data associated with a road portion, receiving sensor data associated with a road agent located on the road portion, defining one or more corridors associated with the road portion based on the map data and the sensor data, extracting a plurality of agent features associated with the road agent based on the sensor data, extracting a plurality of corridor features associated with each of the one or more corridors based on the sensor data, and for each corridor, labeling the training example based on the position of the road agent with respect to the corridor.

In another embodiment, a method may include receiving map data associated with a road portion, receiving sensor data associated with a road agent located on the road portion, defining one or more corridors associated with the road portion based on the map data and the sensor data, extracting a plurality of agent features associated with the road agent based on the sensor data, extracting a plurality of corridor features associated with each of the one or more corridors based on the sensor data, inputting the agent features and the corridor features into a trained neural network, and predicting behavior of the road agent based on an output of the neural network.

In another embodiment, a computing device may comprise one or more processors, one or more memory modules, and machine readable instructions stored in the one or more memory modules. When executed by the one or more processors, the machine readable instructions may cause the server to generate a training data set comprising a plurality of training examples and train a neural network using the training data set. Each training example may be generated by receiving map data associated with a road portion, receiving sensor data associated with a road agent located on the road portion, defining one or more corridors associated with the road portion based on the map data and the sensor data, extracting a plurality of agent features associated with the road agent based on the sensor data, extracting a plurality of corridor features associated with each of the one or more corridors based on the sensor data, and for each corridor, labeling the training example based on the position of the road agent with respect to the corridor.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 4 depicts a flowchart of an example method for training a neural network to make corridor intent predictions, according to one or more embodiments shown and described herein;

FIG. 5 depicts a flowchart of an example method for using a trained neural network to make corridor intent predictions, according to one or more embodiments shown and described herein;

DETAILED DESCRIPTION

Figure 1:
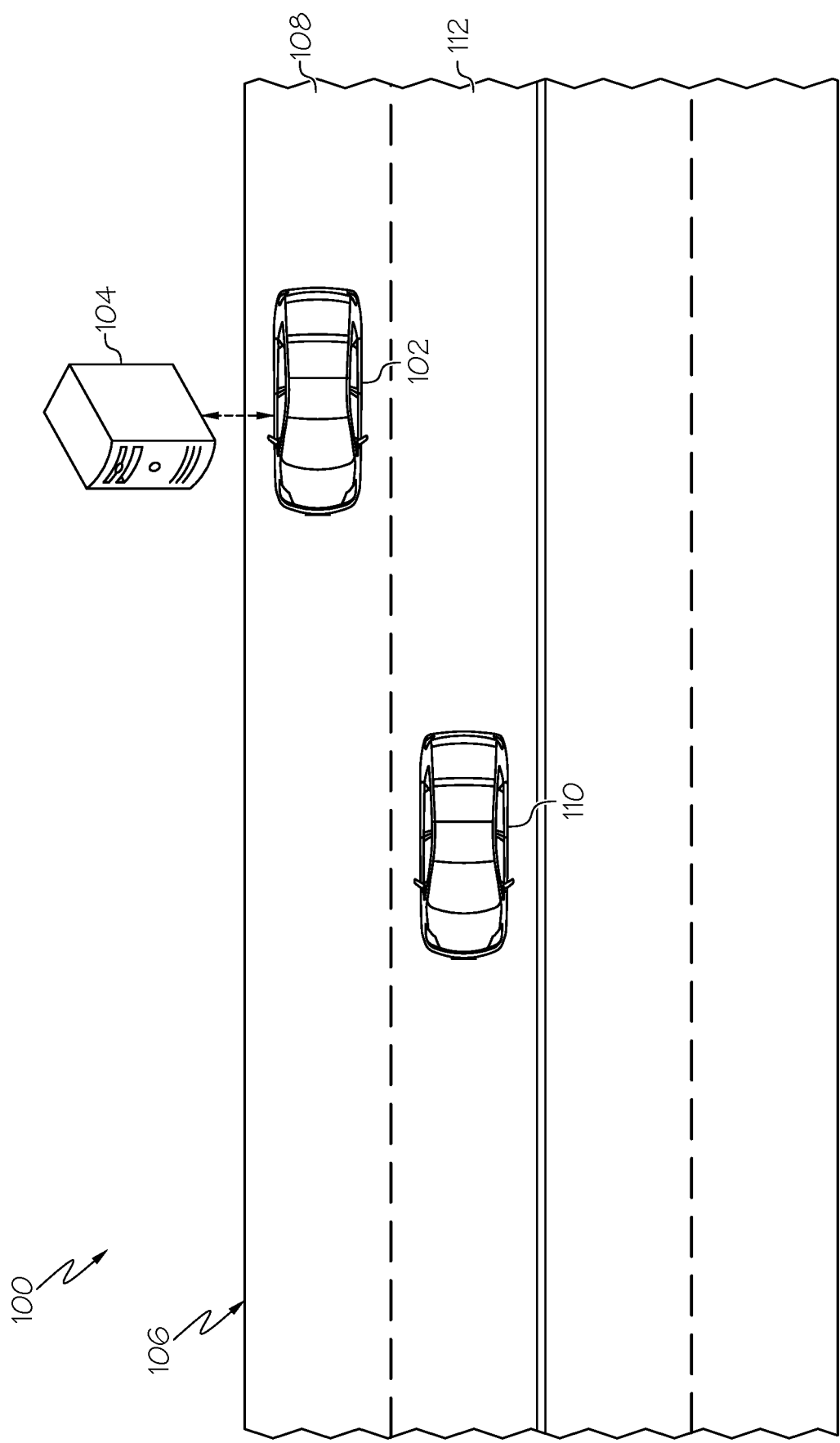
FIG. 1 schematically depicts an example system for making corridor intent predictions, according to one or more embodiments shown and described herein.

The embodiments disclosed herein describe systems and methods for making corridor intent predictions. Autonomous vehicles typically navigate and perform self-driving by gathering sensor data to detect their surrounding environment and by utilizing digital maps. While driving, autonomous vehicles may detect other road agents, such as vehicles or pedestrians. In order to autonomously navigate, autonomous vehicles may monitor other road agents and adjust their driving behavior accordingly. However, it may be desirable for an autonomous vehicle to predict the behavior of other road agents to better adjust the driving behavior of the autonomous vehicle. Specifically, it may be desirable to predict when a vehicle will cut into the lane of the autonomous vehicle.

Drivers typically drive in a particular spatial region. While this is often a lane of a road, there may be circumstances where a vehicle will drive in different spatial regions (e.g., motorcycles may drive in between lanes). Such spatial regions through which a road agent may traverse are referred to herein as corridors. Different types of road agents may travel along different corridors.

As disclosed herein, sensor data may be collected from an autonomous vehicle or other sources to track the movement of road agents through a road portion. A map may be obtained that contains the positions of lanes and other features of the road portion. Corridors may be defined from the map of a road portion by following heuristic rules. Different corridors may be defined depending on the type of road agent present in the road portion.

Once the corridors are defined, features may be extracted from the sensor data that describe a relationship between a road agent and the corridors. Other features may be extracted from the sensor data that relate to the road agent independent of the corridors. The sensor data may also be used to track the road agent over time. As such, data sets may be automatically labeled based on which corridor the road agent is in at a first time and which corridor the road agent is in at a second time. These labels may be used as ground truth values to train a neural network.

The input to the neural network may comprise the extracted features, and the output of the neural network may comprise a prediction about which corridor or corridors the vehicle will occupy at a time in the future. As such, the neural network may be trained using the labeled ground truth values.

Once the neural network is trained, it may be used by an autonomous vehicle to make real-time predictions about the behavior of other road agents. The autonomous vehicle may collect sensor data relating to a road portion on which the vehicle is traveling and other road agents on the road portion. The sensor data may then be used to define corridors based on the type of road agent and to extract features associated with the corridors and the road agent. The features may then be input to the neural network, which may output probabilities of the road agent being in each of the defined corridors at a time in the future. These probabilities may be used by the autonomous vehicle to perform path planning.

FIG. 1 schematically depicts a system 100 for corridor intent prediction. The system 100 includes a vehicle 102 and a server or remote computing device 104. In the illustrated example, the vehicle 102 is an autonomous vehicle driven by computer control. In other examples, the vehicle 102 may be a non-autonomous vehicle driven by a human driver. In the example of FIG. 1, the vehicle 102 drives along a road 106. The vehicle 102 drives in a lane 108, while another vehicle 110 drives in an adjacent lane 112. If the vehicle 110 were to change lanes and cut in front of the autonomous vehicle 102 in lane 108, the vehicle 102 may need to quickly brake or make other driving adjustments. As such, the system 100 may be used to determine a probability that the vehicle 110 will change lanes in front of the vehicle 102, as described herein.

The remote computing device 104 is communicatively coupled to the vehicle 102. In some examples, the remote computing device 104 may be a fixed edge server, e.g., a road-side unit (RSU), and any type of computing device capable of performing the functionalities described herein. In these examples, a variety of similar edge servers may be positioned at various locations along the road 106 or along other roads. In some examples, the remote computing device 104 may be a moving edge server, e.g., another vehicle on the road 106. In some examples, the remote computing device 104 may be positioned near the road 106 such that it may be communicatively coupled to the vehicle 102. In other examples, the remote computing device 104 may be a cloud server or remote computing device. In some examples, one or more of the functions performed by the remote computing device 104 may be performed by the vehicle 102.

Figure 2:
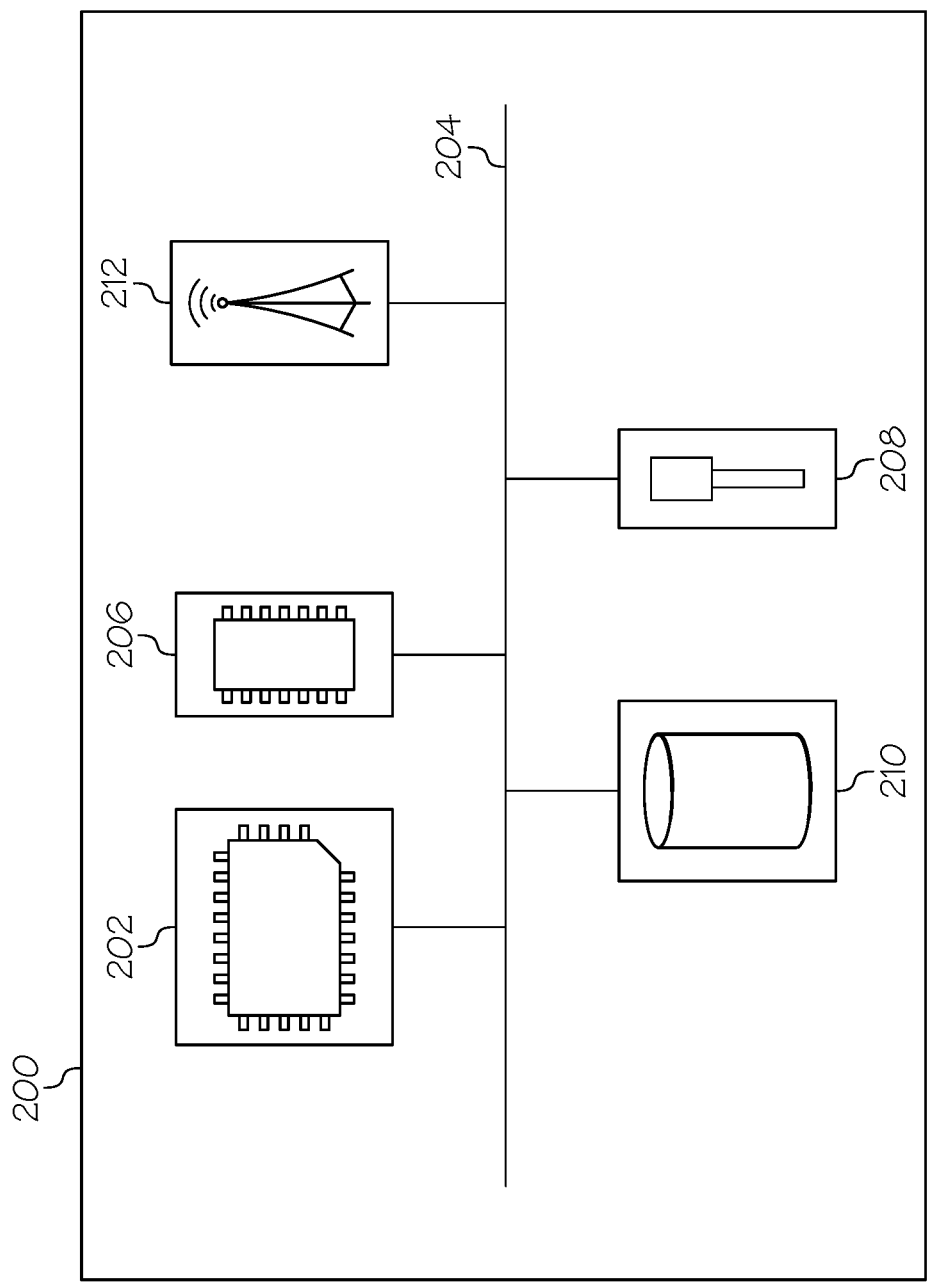
FIG. 2 depicts a schematic diagram of an example vehicle system, according to one or more embodiments shown and described herein.

FIG. 2 depicts an example vehicle system 200 included in the vehicle 102 of FIG. 1. The vehicle system 200 includes one or more processors 202, a communication path 204, one or more memory modules 206, a satellite antenna 208, one or more vehicle sensors 210, and network interface hardware 212, the details of which will be set forth in the following paragraphs. The vehicle system 200 may also include one or more modules for performing autonomous driving of the vehicle 102. These modules are not shown in FIG. 2 for brevity. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the example vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Thus, the satellite antenna 208 allows the vehicle 102 to monitor its location. The vehicle 102 may transmit its location to the remote computing device 104, as explained in further detail below.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors, proximity sensors, location sensors), and the like. The vehicle sensors 210 may be used to navigate the autonomous vehicle 102. In addition, the vehicle sensors 210 may detect information regarding other road agents, such as the vehicle 110 in the example of FIG. 1, as discussed in further detail below.

Still referring to FIG. 2, the vehicle system 200 comprises network interface hardware 212 for communicatively coupling the vehicle system 200 to the remote computing device 104. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. The network interface hardware 212 of the vehicle system 200 may transmit information about pedestrians detected by the vehicle sensors 210 to the remote computing device 104. In some examples, the network interface hardware 212 may transmit one or more images captured by the vehicle sensors 210 to the remote computing device 104. In some examples, the network interface hardware 212 may receive a map of a particular location from the remote computing device 104 that the autonomous vehicle 102 may use to navigate.

In some embodiments, the vehicle system 200 may be communicatively coupled to the remote computing device 104 (See FIG. 1) by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
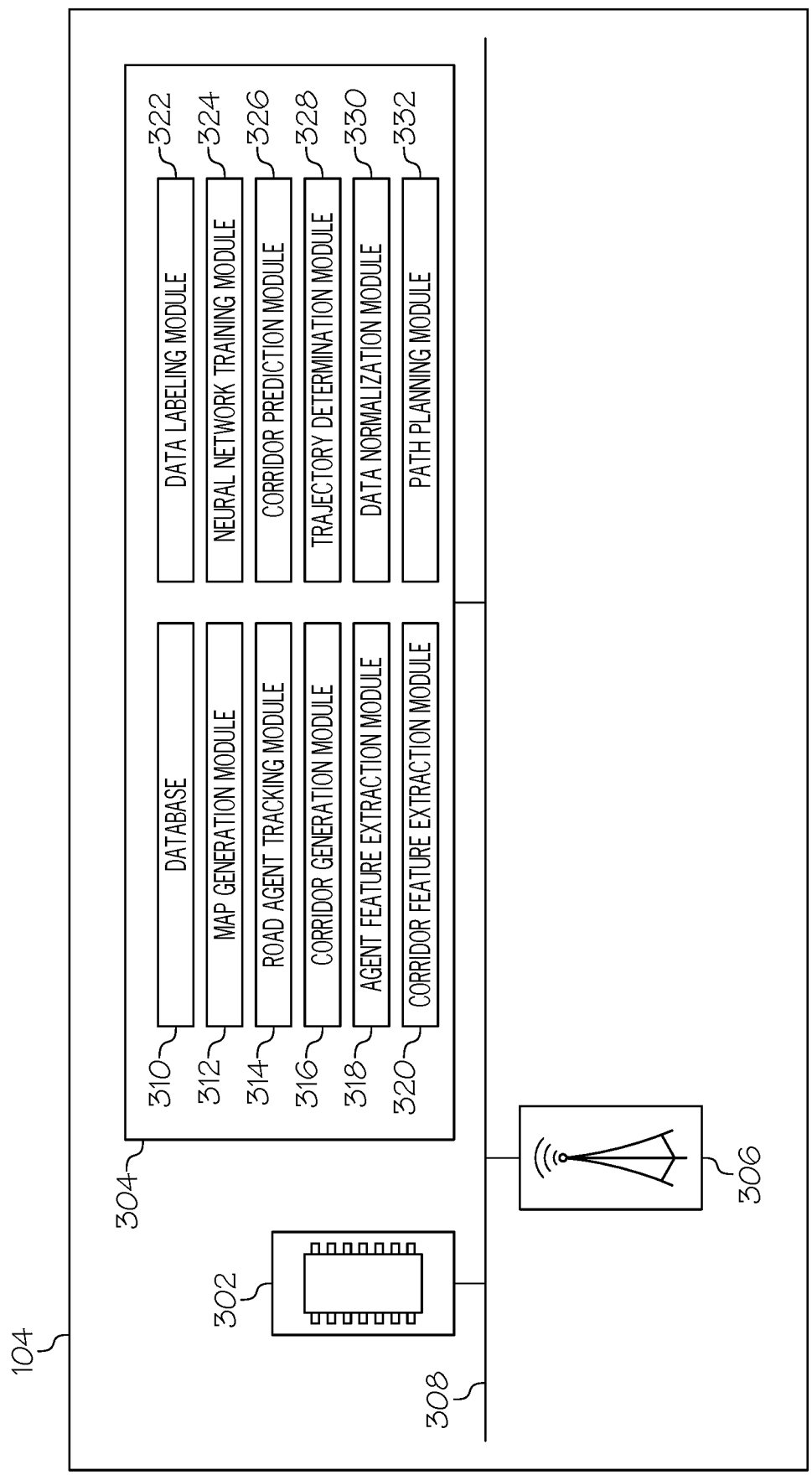
FIG. 3 depicts a schematic diagram of an example server for making corridor intent predictions, according to one or more embodiments shown and described herein.

Now referring to FIG. 3, the remote computing device 104 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302. The communication path 308 provides signal interconnectivity between various modules of the remote computing device 104.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the remote computing device 104 may transmit and receive data to and from the vehicle 102.

The one or more memory modules 304 include a database 310, a map generation module 312, a road agent tracking module 314, a corridor generation module 316, an agent feature extraction module 318, a corridor feature extraction module 320, a data labeling module 322, a neural network training module 324, a corridor prediction module 326, a trajectory determination module 328, a data normalization module 330, and a path planning module 332. Each of the database 310, the map generation module 312, the road agent tracking module 314, the corridor generation module 316, the agent feature extraction module 318, the corridor feature extraction module 320, the data labeling module 322, the neural network training module 324, the corridor prediction module 326, the trajectory determination module 328, the data normalization module 330, and the path planning module 332 may be a program module in the form of operating systems, application program modules, and other program modules stored in one or more memory modules 304. In some embodiments, the program module may be stored in a remote storage device that may communicate with the remote computing device 104. In some embodiments, one or more of the database 310, the map generation module 312, the road agent tracking module 314, the corridor generation module 316, the agent feature extraction module 318, the corridor feature extraction module 320, the data labeling module 322, the neural network training module 324, the corridor prediction module 326, the trajectory determination module 328, the data normalization module 330, and the path planning module 332 may be stored in the one or more memory modules 206 of the vehicle system 200. Such a program module may include, but is not limited to, routines, subroutines, programs, objects, components, data structures and the like for performing specific tasks or executing specific data types as will be described below.

The database 310 may temporarily or permanently store a variety of data. For example, the database 310 may store map data associated with one or more road portions, data received from vehicles (e.g., autonomous vehicle 102) or other sources (e.g., traffic cameras), or parameters of the neural network used by the system 100. The usage of the data stored in the database 310 is discussed in further detail below.

Referring still to FIG. 3, the map generation module 312 may generate a map of a road portion. The map generation module 312 may receive map data from a map server or other source. The map data may include positions and shapes of lanes of one or more roads in the road portion as well as other data relating to the road portion. The map generation module 312 may generate a graph representing a map of the road portion. Such a graph may comprise a plurality of nodes representing different segments of the road portion through which a road agent may traverse. The nodes may then be connected by edges representing a potential path of a road agent.

Figure 6:
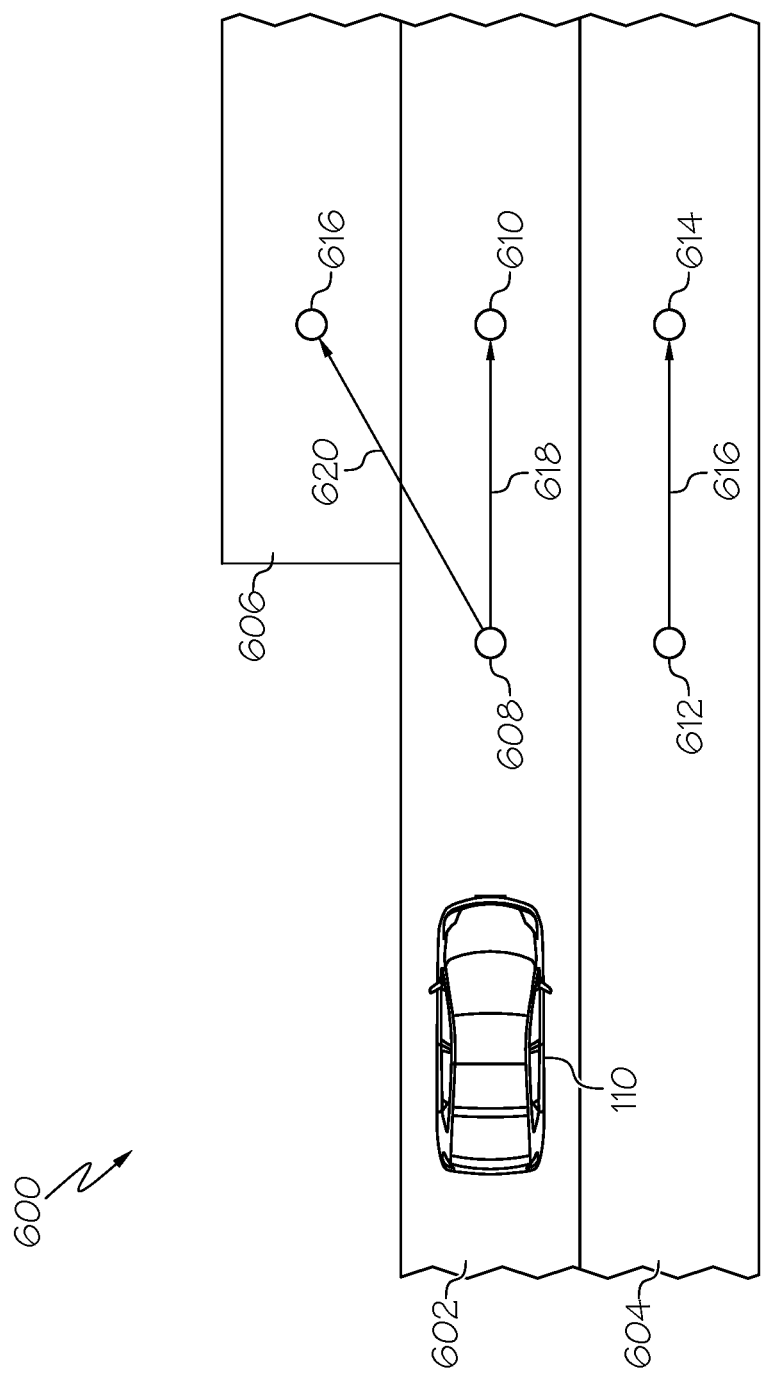
FIG. 6 depicts an example map graph of a road portion, according to one or more embodiments shown and described herein.

The map generation module 312 may generate a different graph for different types of road agents. For example, for a car, the nodes of the graph may be positioned within lanes, since cars typically drive within a lane. For a motorcycle, nodes of the graph may be positioned in between lanes, since motorcycles sometimes drive in between lanes. For pedestrians, the nodes of the graph may be positioned along sidewalks or crosswalks. FIG. 6 shows an example graph 600 of a road portion that may be generated by the map generation module 312.

In the example of FIG. 6, vehicle 110 is driving along a lane 602. An adjacent lane 604 is next to the lane 602. In front of the vehicle 110, a new lane 606 begins. The graph 600 includes nodes 608 and 610, corresponding to segments of lane 602, and nodes 612 and 614, corresponding to segments of lane 604. The graph 600 also includes node 616, representing a segment of the new lane 606. The graph 600 includes edge 616 connecting nodes 612 and 614, edge 618 connecting nodes 608 and 610, and edge 620 connecting nodes 608 and 616. The edges 616, 618, and 620 represent different paths that a vehicle might take while driving along the road portion represented by the graph 600.

In some examples, one or more heuristic rules may be used to determine where to place the nodes in a graph of a road portion. Different rules may be used for different types of road agents. For example, for a car, nodes may be placed in the center of lanes. In another example, if a lane is greater than a certain width, two nodes may be placed next to each other within the lane representing two different portions of the lane through which a vehicle may travel.

Figure 16:
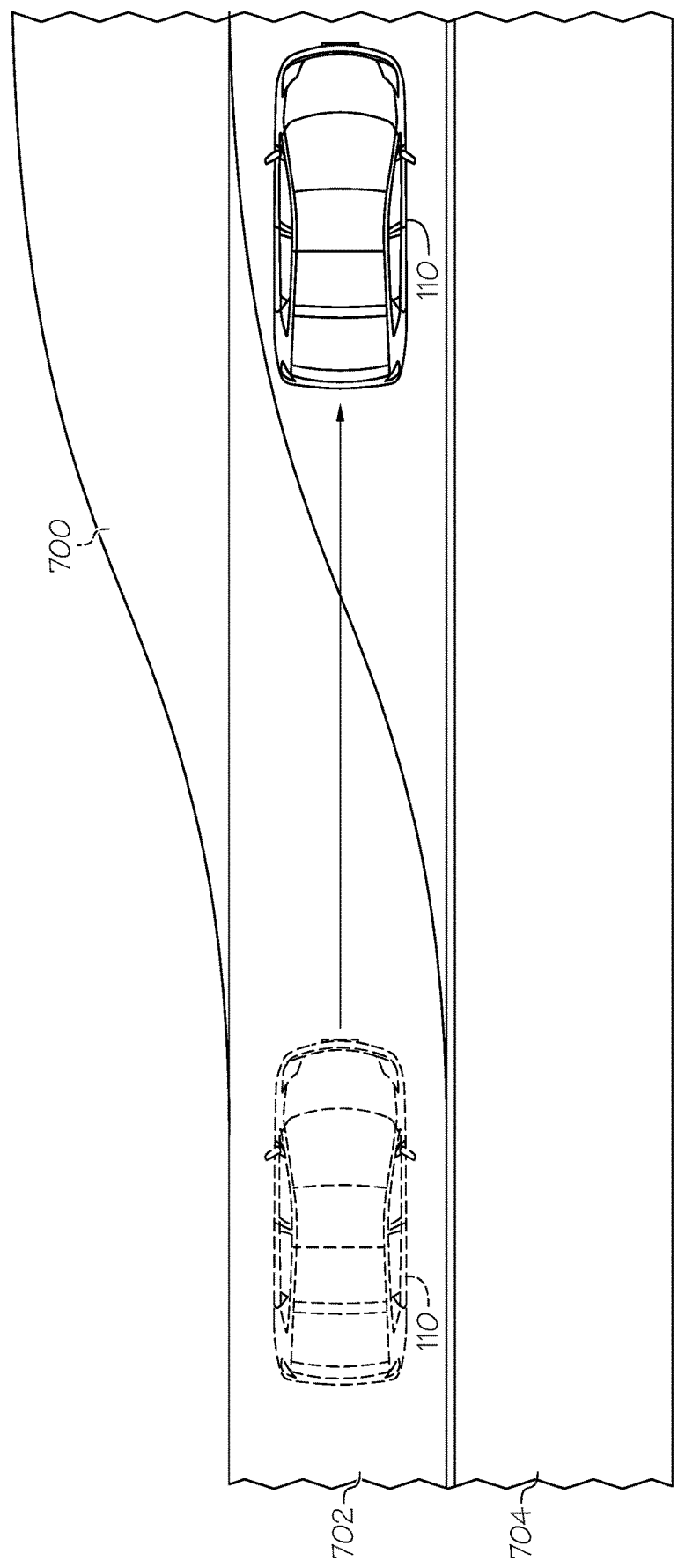
FIG. 16 depicts a time sequence of positions of an example vehicle on an example road portion, according to one or more embodiments shown and described herein.

Referring back to FIG. 3, the road agent tracking module 314 may track road agents as they move along one or more road portions. The road agent tracking module 314 may receive sensor data and may detect one or more road agents based on the sensor data. The road agent tracking module 314 may then associate a unique ID with each identified road agent. The unique ID may be used to track the position of the road agent over time. For example, FIG. 16 shows a time sequence of positions of vehicle 110 as it drives along a road. As the road agent tracking module 314 tracks one or more road agents over time, data associated with the road agents may be stored in the database 310. The data stored may include a variety of data associated with the road agents such as position, speed, heading, and other data determined from the received sensor data. The road agent tracking module 314 may store data associated with road agents along with an ID of the road agent and a timestamp indicating a time at which the data was captured. This may allow the data to be used by the other memory modules 304, as explained below. In particular, the data may be used to train a neural network.

The corridor generation module 316 may define or generate one or more corridors associated with a road portion based on the map data received by the map generation module 312 and the sensor data received by the road agent tracking module 314. As explained above, vehicles typically drive within lanes of a road but in certain situations, some road agents may drive in a spatial region not strictly defined by lanes. Thus, the corridor generation module 316 defines corridors that represent spatial regions through which road agents may travel.

The corridor generation module 316 may have two modes of operation. In a first mode of operation, the corridor generation module 316 may generate corridors to be used as training data to train a neural network to make corridor intent predictions. In this mode of operation, the corridor generation module 316 may access sensor data received by the road agent tracking module 314 and stored in the database 310 representing past states of road agents. The corridor generation module 316 may then generate corridors based on this stored data. In a second mode of operation, the corridor generation module 316 may generate corridors based on real-time data received from an autonomous vehicle. These corridors may be used to make real-time predictions about road agent behavior. In some examples, different memory modules may be used to perform the first mode of operation and the second mode of operation.

As explained above, different types of road agents may traverse roads in different manners. For example, motorcycles may drive in between lanes and pedestrians may use sidewalks and crosswalks. As such, the corridor generation module 316 may generate different corridors for different types of road agents.

In embodiments, the corridor generation module 316 may generate a corridor for a particular road portion by accessing a graph of the road portion created by the map generation module 312. As explained above, the map generation module 312 may generate different graphs of a road portion for different types of road agents. Thus, the corridor generation module 316 may access a graph for a particular type of road agent to create a corridor for that type of road agent.

Figure 7:
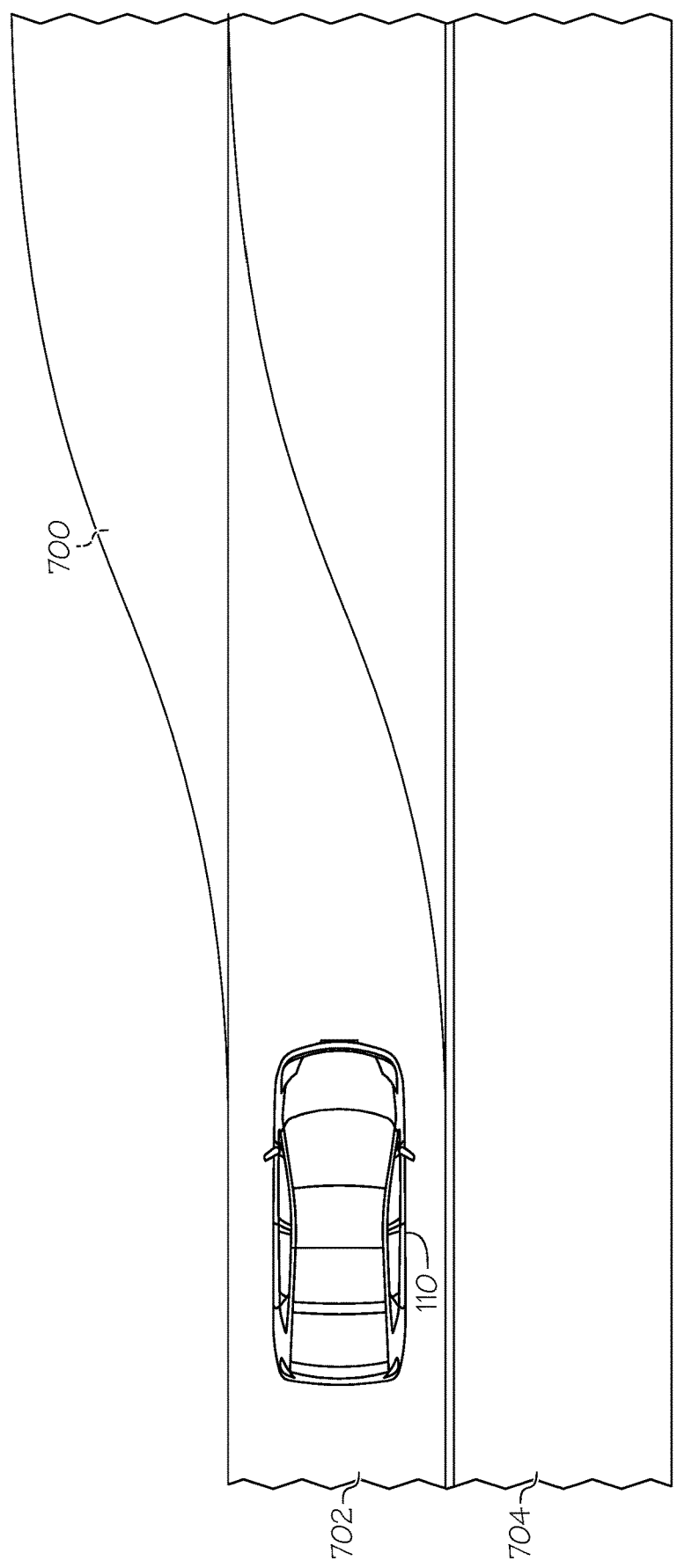
FIG. 7 depicts example corridors associated with a road portion, according to one or more embodiments shown and described herein.

Once the corridor generation module 316 accesses a graph of a road portion for a particular type of road agent, the corridor generation module 316 may perform a breadth first search of the nodes of the graph to a certain depth. The depth of the breadth first search to be performed is a parameter that may be set by a user. To perform the breadth first search, the corridor generation module 316 may start at a node of the graph representing a position of a road agent. This may either be a current position of a road agent based on sensor data received from an autonomous vehicle or a past position of a road agent based on data stored in the database 310. The corridor generation module 316 may then move from that node to other nodes along connected edges of the graph to the desired depth to generate a corridor. For example, FIG. 6 shows corridor generation using a breadth first search to a depth of one. The vehicle 110 may travel from node 608 to node 610 or may travel from node 608 to node 616. Further, if the vehicle 110 were in lane 604, it could travel from node 612 to node 614. Thus, three corridors may be generated in the example of FIG. 6. FIG. 7 shows a view of three corridors 700, 702, 704 that may be generated by the corridor generation module 316 for the graph 600 of FIG. 6. In some examples, nodes in laterally adjacent lanes of the graph 600 may be connected by edges to indicate that a road agent may laterally change lanes. For example, edges may connect nodes 608 and 612, nodes 610 and 614, and nodes 610 and 616. These edges may also be part of the breadth first search performed by the corridor generation module 316.

Referring back to FIG. 3, the agent feature extraction module 318 may extract features related to a road agent, referred to herein as agent features. Similar to the corridor generation module 316, the agent feature extraction module 318 may have two modes of operation. In a first mode of operation, the agent feature extraction module 318 extracts features of road agents based on data stored in the database 310 to be used as training data. In a second mode of operation, the agent feature extraction module 318 extracts features of road agents in real-time based on data received from an autonomous vehicle. In some embodiments, two different memory modules may be used for the two different modes of operation of the agent feature extraction module 318.

The agent feature extraction module 318 may extract a variety of agent features related to a road agent at a particular time. These agent features may include data such as the type of road agent, the position of the road agent, the heading of the road agent, the speed and acceleration of the road agent, and the like. Any number of data points relating to the road agent may be extracted as agent features based on sensor data either received in real-time or stored in the database 310.

Referring still to FIG. 3, the corridor feature extraction module 320 may extract features associated with corridors generated by the corridor generation module 316. The features are referred to herein as corridor features. Similar to the agent feature extraction module 318, the corridor feature extraction module 320 may have two modes of operation; a first mode of operation to generate training data using sensor data stored in the database 310 and a second mode of operation for real-time use using real-time data received from an autonomous vehicle.

The corridor feature extraction module 320 may extract a variety of corridor features associated with corridors generated by the corridor generation module 316. Specifically, corridor features may describe a relationship between a corridor and a road agent. For example, corridor features may include a distance between a road agent and a corridor section, an angle between a vehicle heading and points along a corridor, and the like. In embodiments, any set of features describing a relationship between a road agent and a corridor may be used as corridor features. The corridor feature extraction module 320 may extract features independently for each corridor.

Figure 8:
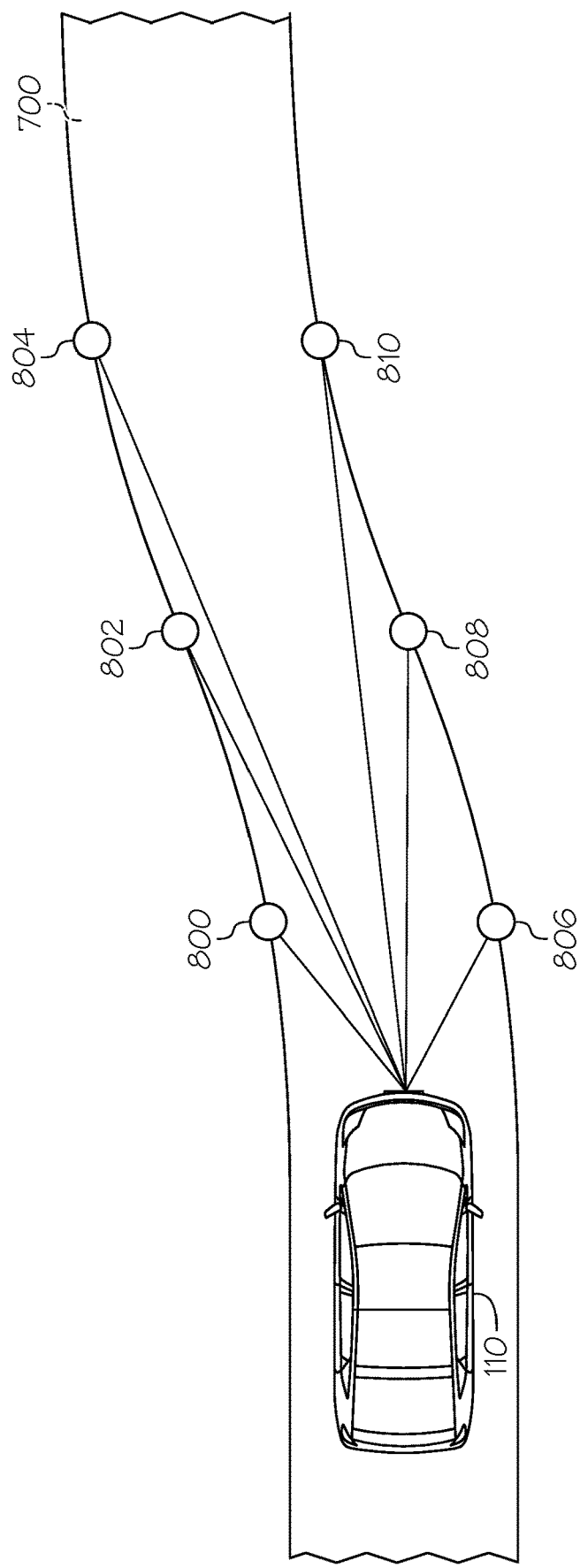
FIG. 8 depicts an example corridor and associated corridor features, according to one or more embodiments shown and described herein.
Figure 9:
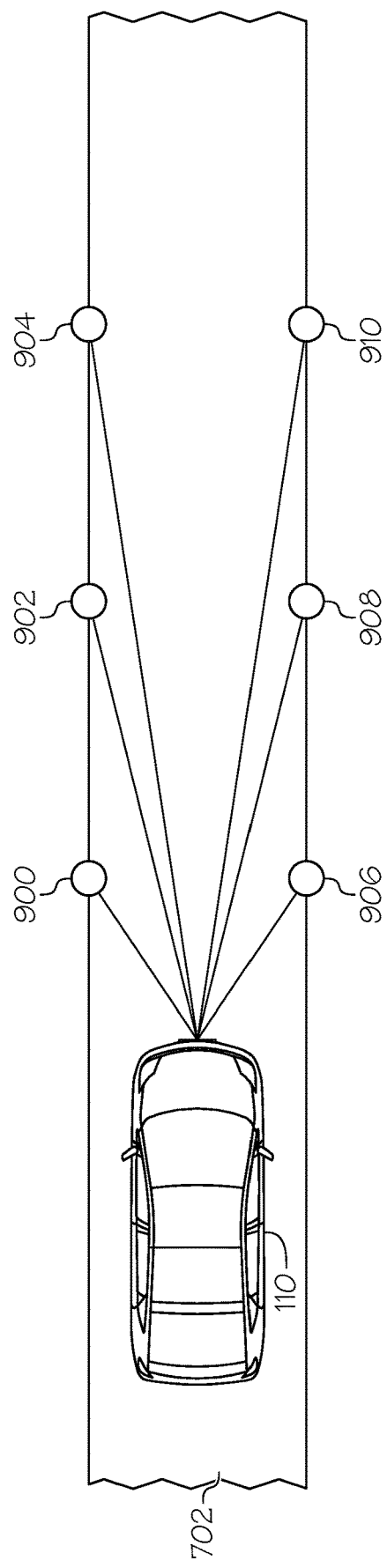
FIG. 9 depicts another example corridor and associated corridor features, according to one or more embodiments shown and described herein.
Figure 10:
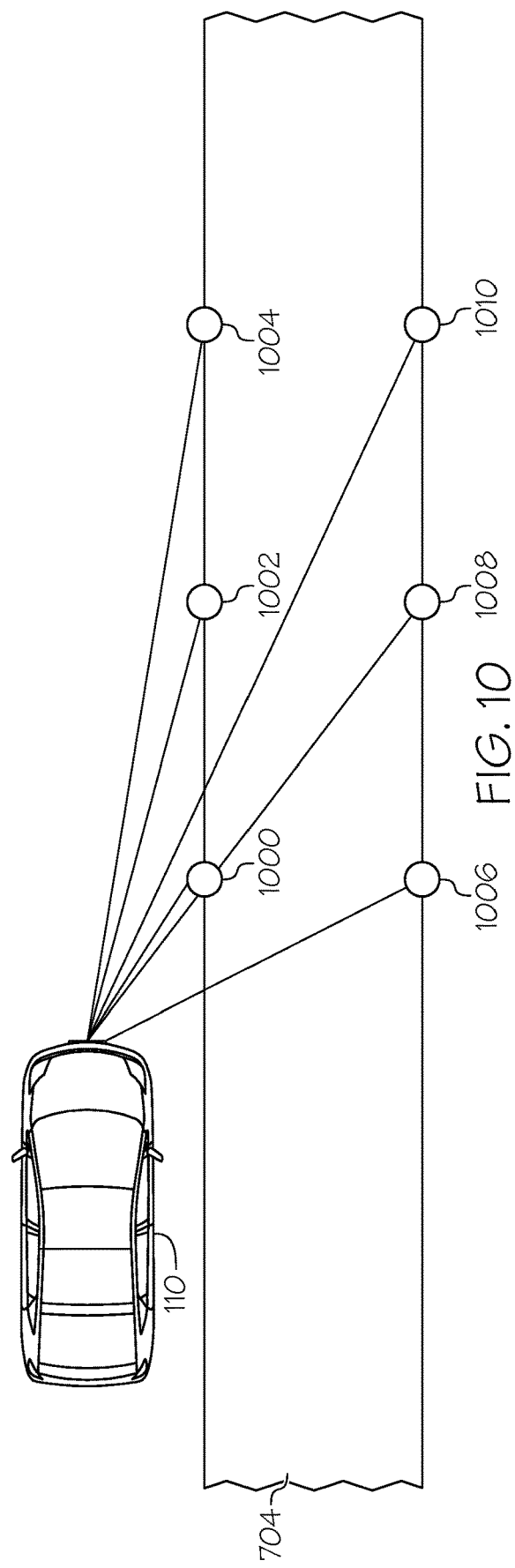
FIG. 10 depicts another example corridor and associated corridor features, according to one or more embodiments shown and described herein.

FIG. 8 shows an example of corridor features 800, 802, 804, 806, 808, and 810 associated with corridor 700 of FIG. 7. Each of the corridor features 800, 802, 804, 806, 808, and 810 may comprise a number that represents a relationship between the vehicle 110 and the corridor 700. Similarly, FIG. 9 shows an example of corridor features 900, 902, 904, 906, 908, and 910 associated with corridor 702 of FIG. 7. Likewise, FIG. 10 shows an example of corridor features 1000, 1002, 1004, 1006, 1008, and 1010 associated with corridor 704 of FIG. 7.

Referring back to FIG. 3, the data labeling module 322 may label data to be used as training data to train a neural network. Specifically, the data labeling module 322 may create a label associated with a particular set of agent features and corridor features at a particular time. The set of agent features and corridor features for which the data labeling module 322 may be stored in the database 310.

In order to create a label, the data labeling module 322 may observe the behavior of a road agent over a certain time period. As discussed above, the road agent tracking module 314 may track a road agent over time based on received sensor data. Thus, the data labeling module 322 may access data stored in the database 310 to determine the position of a road agent at a first time and the position of the road agent at a second time (e.g., one second later). The length of time between the first time and the second time is referred to herein as a time step. The specific length of a time step may be set by a user.

Figure 11:
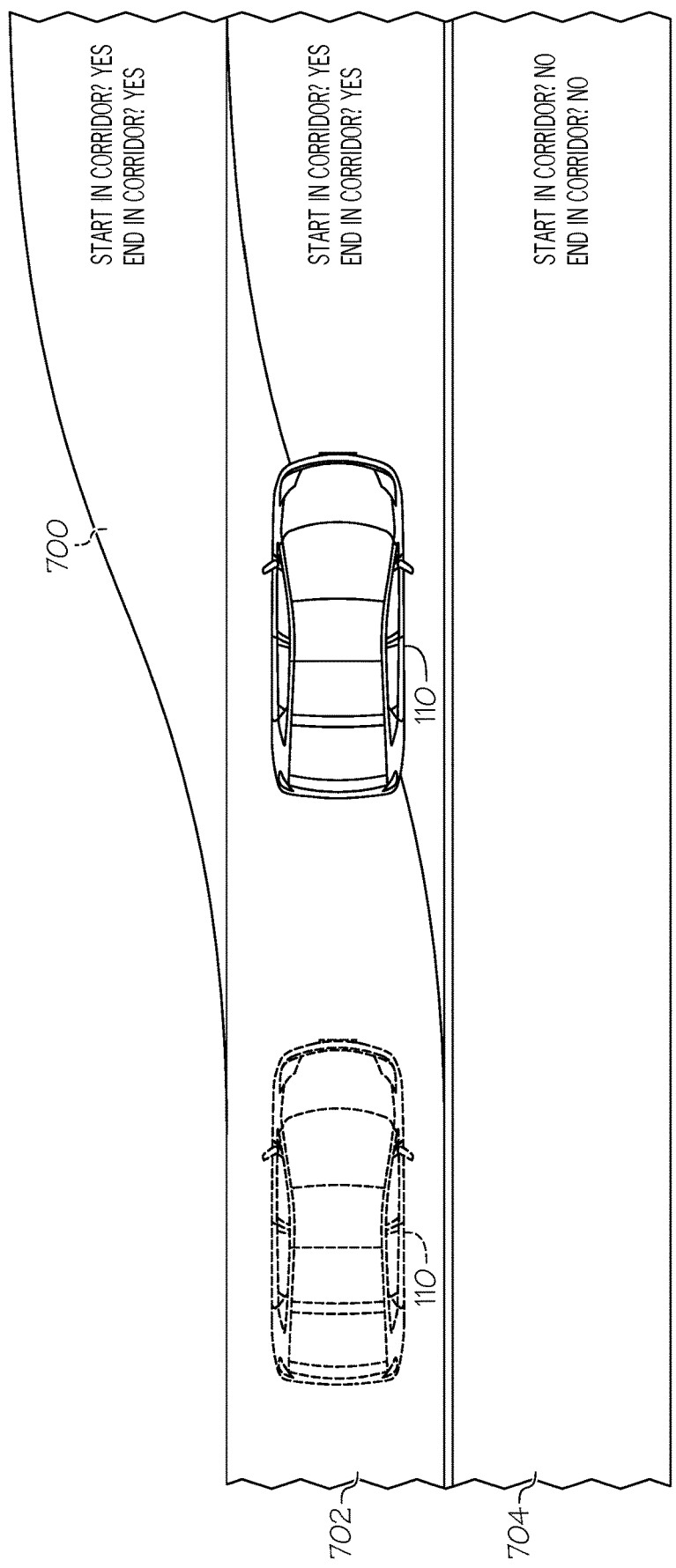
FIG. 11 depicts example labeling of corridors associated with a road portion, according to one or more embodiments shown and described herein.

Once the data labeling module 322 determines the position of the road agent at first and second times, the data labeling module 322 may determine which corridor or corridors the road agent was in at the first time and which corridor or corridors the road agent was in at the second time. The data labeling module 322 may then create a label for each corridor indicating whether the road agent was in the corridor at the first time and whether the road agent was in the corridor at the second time. For example, FIG. 11 shows a position of vehicle 110 at two different times along the road portion having the corridors 700, 702, 704 of FIG. 7. In the example of FIG. 11, the vehicle 110 is in corridor 700 at the first time and the second time. The vehicle 110 is also in corridor 702 at the first time and the second time. The vehicle 110 is not in corridor 704 at either the first time or the second time. It should be understood that because corridors may overlap, it is possible for a vehicle to be in more than one corridor at a time.

Figure 13:
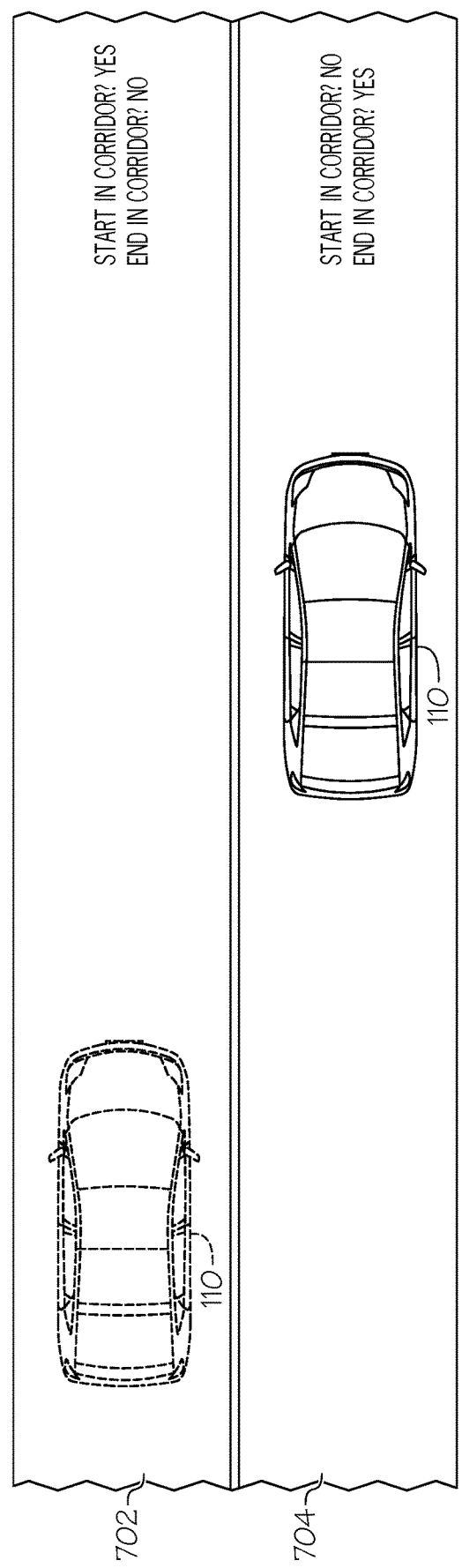
FIG. 13 depicts another example labeling of corridors associated with a road portion, according to one or more embodiments shown and described herein.

FIG. 13 shows another example where vehicle 110 changes lanes. In the example of FIG. 13, the vehicle 110 is in corridor 702 at the first time but the vehicle 110 is not in the corridor 702 at the second time. Further, the vehicle 110 is not in corridor 704 at the first time but the vehicle 110 is in the corridor 704 at the second time.

As discussed above, the agent feature extraction module 318 and the corridor feature extraction module 320 may store agent features and corridor features, respectively, associated with a road agent at a particular time in the database 310. Thus, the data labeling module 322 may create a label associated with a road agent and associated agent features and corridor features at a particular time where the label comprises an indication of which corridors the road agent occupied at the particular time and which corridors the road agent occupied one time step later (e.g., one second later). As such, the set of agent features and corridor features and the label created by the data labeling module 322 may comprise a single training example to be used to train a neural network as discussed below. The data labeling module 322 may create any number of labels associated with different sets of agent features and corridor features to create a plurality of training examples. The plurality of training examples may be combined into a training data set to train a neural network.

Figure 12:
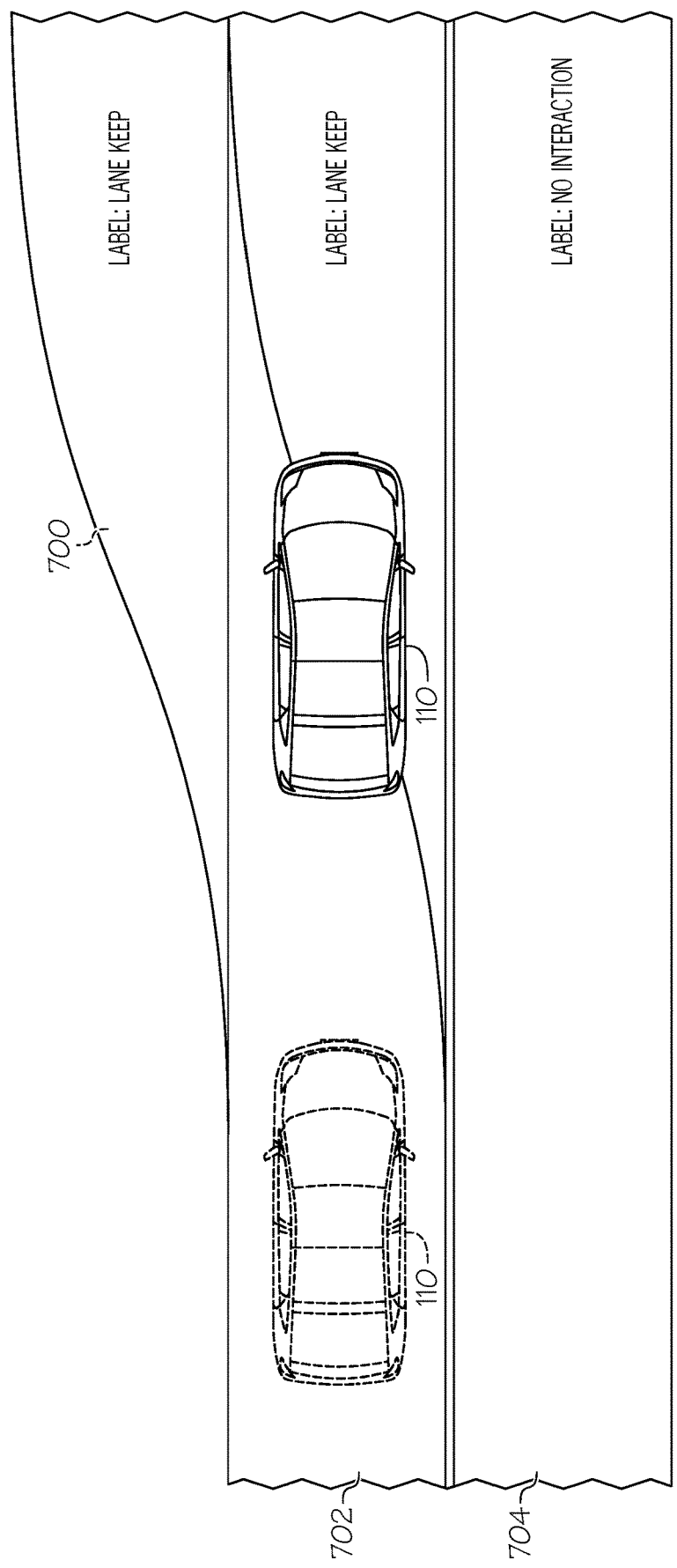
FIG. 12 depicts another example labeling of corridors associated with a road portion, according to one or more embodiments shown and described herein.
Figure 14:
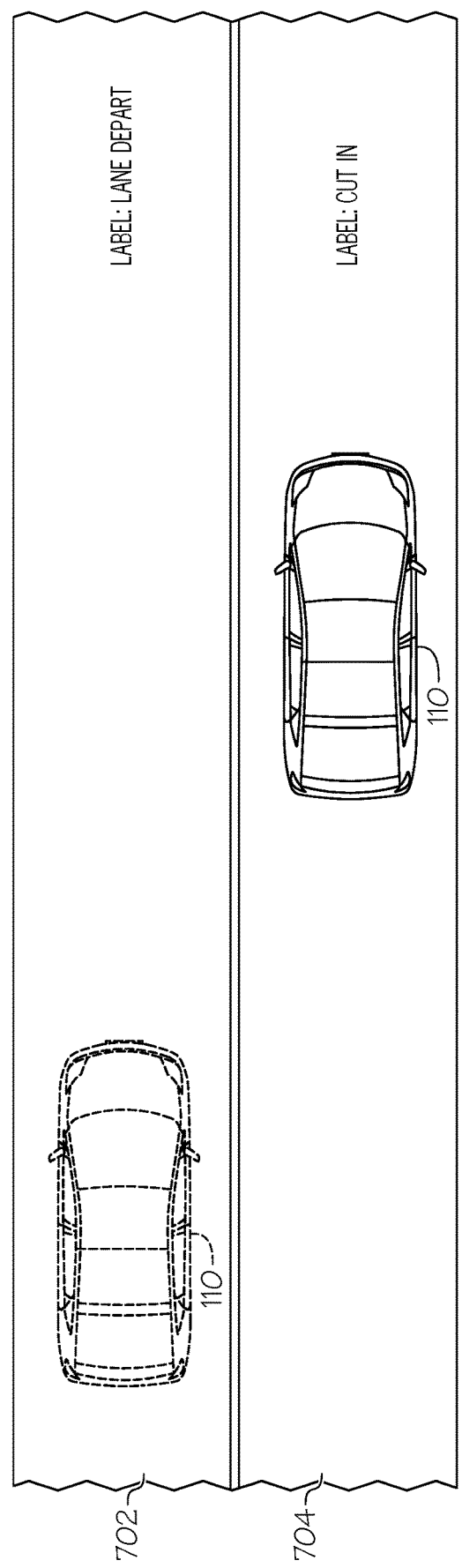
FIG. 14 depicts another example labeling of corridors associated with a road portion, according to one or more embodiments shown and described herein.

In some examples, in addition to identifying whether a road agent occupied a particular corridor at a first time and whether the road agent occupied the same corridor at a second time, the data labeling module 322 may also create a label to indicate one of four actions based on the movement of the road agent. If a road agent starts in a corridor and ends in the corridor, it may be labeled lane keep, indicating that the road agent remained in the corridor. FIG. 12 shows an example of lane keep with respect to corridors 700 and 702. If a road agent neither starts nor ends in a particular corridor, it may be labeled no interaction, indicating that the road agent had no interaction with the corridor. FIG. 12 shows an example of no interaction with respect to corridor 704. If a road agent starts in a corridor but does not end in the corridor, it may be labeled lane depart, indicating that the road agent departed from the corridor. FIG. 14 shows an example of lane depart with respect to corridor 702. Lastly, if a road agent does not start in a corridor but ends in the corridor, it may be labeled cut in, indicating that the road agent cut into the corridor. FIG. 14 shows an example of cut in with respect to corridor 704.

Figure 15:
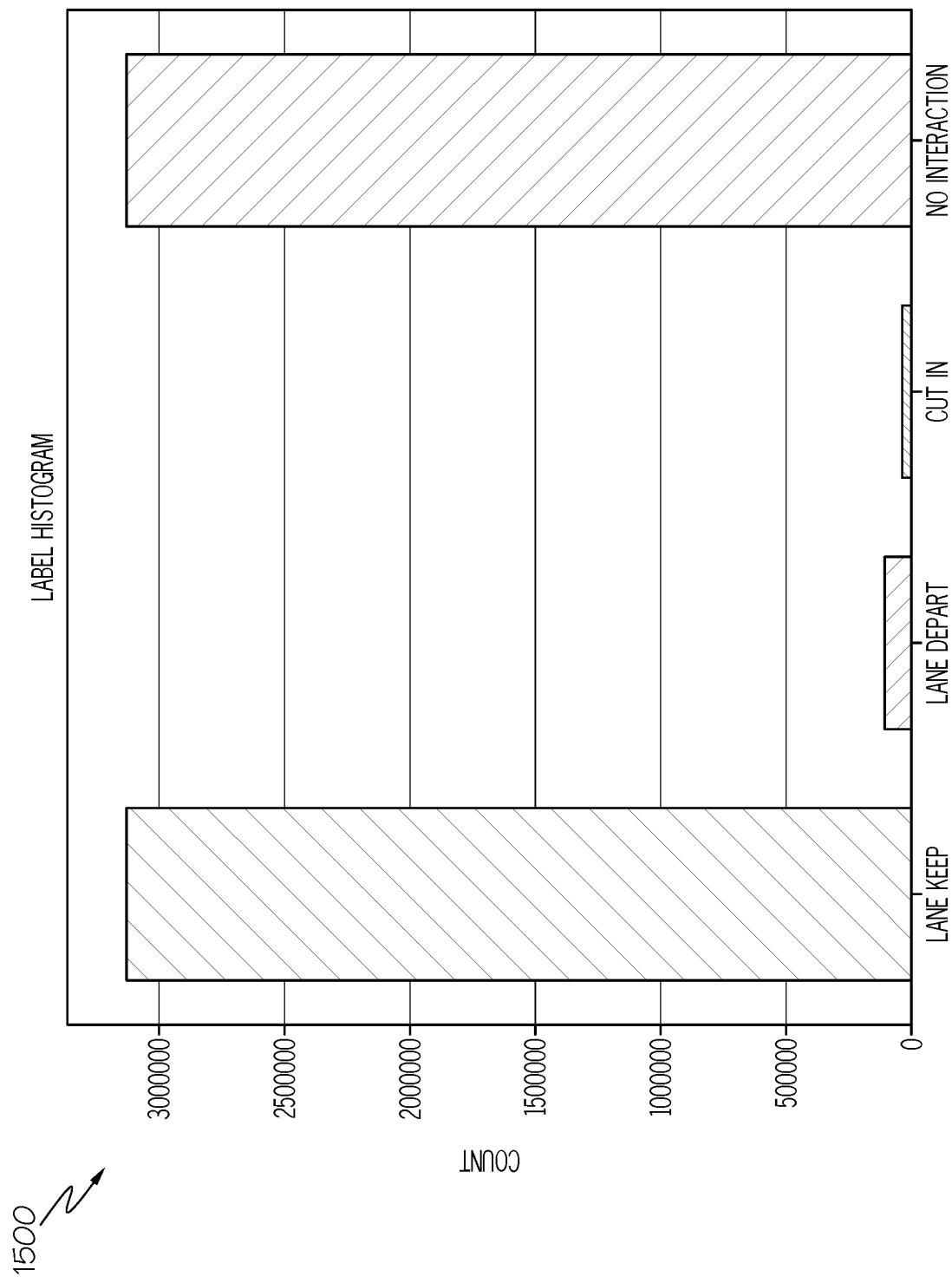
FIG. 15 depicts a histogram of labels for an example road portion, according to one or more embodiments shown and described herein.

FIG. 15 shows a histogram of these four labels for a sample data set. As can be seen in FIG. 15, the two most common actions are lane keep and no interaction. This is because, for the majority of time that a vehicle is being driven, vehicles travel straight, only changing lanes rarely. As such, if a vehicle starts in a particular corridor at a first time, it will most often remain in that corridor at a second time, which corresponds to a lane keep label. Further, if a vehicle does not start in a particular corridor at a first time, it will most often not be in that corridor at a second time, which corresponds to a no interaction label. The situations where a vehicle moves between corridors, indicated by a lane depart or cut in label, are less frequent. However, these rare events involving lane changes are primarily what the system 100 is attempting to predict. As such, the lane depart and cut in labels may be used to weight these situations more heavily when calculating a loss function during neural network training.

Referring back to FIG. 3, the neural network training module 324 may train a neural network using the training data created by the data labeling module 322. Specifically, the neural network may be trained to predict whether a road agent will enter or exit a particular corridor based on agent features and corridor features recorded at a particular time. More specifically, the neural network may receive as input, agent features and corridor features associated with a road agent and one or more corridors at a first time, and output a probability that the road agent will occupy each of the one or more corridors at a second time, one time step later (e.g., one second later). The neural network training module 324 may train the neural network using the techniques described herein.

Figure 17:
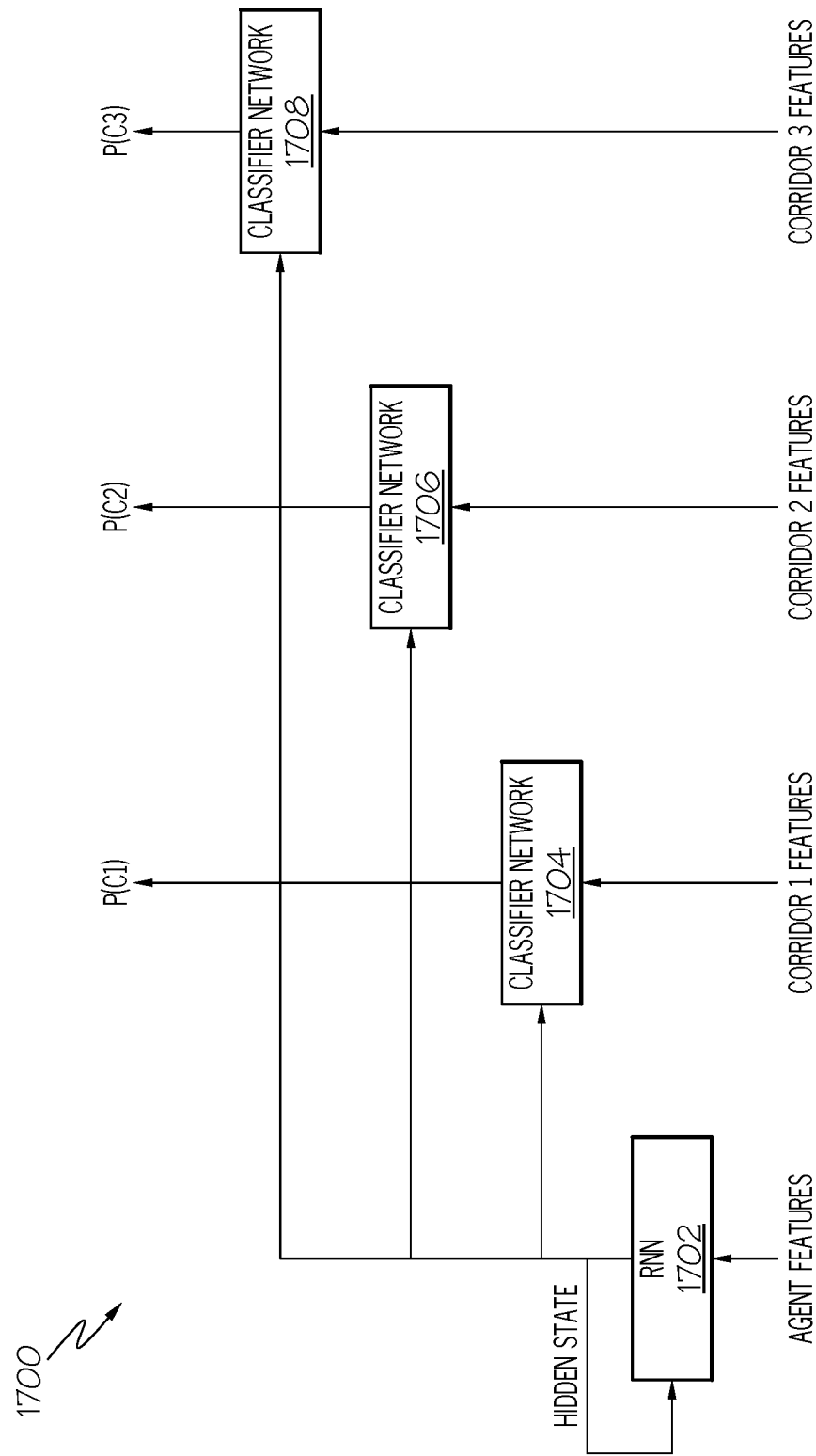
FIG. 17 depicts an example neural network, according to one or more embodiments shown and described herein.

Referring to FIG. 17, an example neural network 1700 is shown. It should be understood that the neural network 1700 of FIG. 17 is one example neural network that may be used as part of the system 100 and other exemplary neural networks are possible. In the example of FIG. 17, the neural network 1700 may be used for road portions having three corridors. However, in other examples, the neural network 1700 may be extended for use with any number of corridors. The neural network 1700 comprises a recurrent neural network (RNN) 1702 and three classifier networks 1704, 1706, and 1708. Each of the classifier networks 1704, 1706, and 1708 is associated with a different corridor.

In embodiments, the neural network training module 324 may train the neural network 1700 as discussed herein. As discussed above, each training example of a training data set may comprise a set of agent features determined by the agent feature extraction module 318, a set of corridor features associated with one or more corridors, determined by the corridor feature extraction module 320, and a ground truth label indicating, for each of the one or more corridors, whether a road agent started in a corridor and whether the road agent ended in the corridor.

To train the neural network 1700, the neural network training module 324 may input the agent features of a training example into the recurrent neural network 1702. Recurrent neural networks are ideal for use with sequences of data. As such, a recurrent neural network is used in the example of FIG. 17 because the agent features associated with a road agent comprise a time series of data. Any type of recurrent neural network may be used as the RNN 1702 of FIG. 17.

After the neural network training module 324 inputs the agent features of a training example into the RNN 1702, the RNN 1702 may output a vector comprising a hidden state or hidden layer based on the input agent features and the parameters of the RNN 1702. The output of the RNN 1702 may be input to the classifier network 1704 along with the corridor features of a first corridor associated with the training example. Similarly, the output of the RNN 1702 may be input to the classifier network 1706 along with the corridor features of a second corridor, and the output of the RNN 1702 may be input to the classifier network 1708 along with the corridor features of third corridor. The classifier network 1704 may output a probability that the road agent will be positioned within the first corridor one time step after a first time associated with the training example (e.g., one second later) based on the input to the classifier network 1704 and the parameters of the classifier network 1704. Similarly, the classifier networks 1706 and 1708 may output probabilities that the road agent will be positioned within the second and third corridors, respectively, after one time step based on the inputs to the classifier networks 1706 and 1708 and the parameters of the classifier networks 1706 and 1708. The classifier networks 1704, 1706, and 1708 may be any type of neural network with hyperparameters set by a user. For example, the classifier networks 1704, 1706, and 1708 may be fully connected neural networks with any number of hidden layers and any number of nodes in each layer. The parameters of the RNN 1702 and the classifier networks 1704, 1706, and 1708 may be stored in the database 310.

Once the classifier networks 1704, 1706, and 1708 output the probabilities that the road agent associated with the agent features and corridor features of the training example will be in each of the three corridors at the second time, the neural network training module 324 may compute a loss function associated with the training example based on the ground truth label of whether the road agent is in each of the corridors at the second time. Specifically, the loss function may be computed based on a difference between the ground truth label and the probabilities output by each of the classifier networks 1704, 1706, and 1708. Any known technique for computing a loss function may be used.

The neural network training module 324 may repeat the above process for any number of training examples of the training data set. That is, for any number of training examples, the neural network training module 324 may input the agent features and corridor features associated with the training examples into the RNN 1702 and classifier networks 1704, 1706, and 1708, respectively, and compute loss functions for each of the training examples. The neural network training module 324 may then computer an overall cost function for the training data set by combining the loss functions computed for each training example. The parameters of the RNN 1702 and the classifier networks 1704, 1706, and 1708 may then be updated using any optimization algorithm (e.g., gradient descent) to minimize the cost function. This may be performed for any number of iterations to train the neural network 1700.

Referring back to FIG. 3, the corridor prediction module 326 may use the trained neural network 1700 to make predictions about road agent behavior, as described herein. Specifically, the corridor prediction module 326 may be used to make real-time predictions of road agent behavior based on real-time sensor data collected by an autonomous vehicle. In operation, an autonomous vehicle driving on a road portion may collect sensor data regarding a road agent that is also driving along the road portion. The sensor data may be transmitted by the autonomous vehicle to the remote computing device 104. The agent feature extraction module 318 may extract agent features regarding the road agent based on the received sensor data, as discussed above. Further, the corridor generation module 316 may generate one or more corridors associated with the road portion, as discussed above, and the corridor feature extraction module 320 may extract corridor features associated with the corridors and the road agent based on the sensor data, as discussed above. The corridor prediction module 326 may then input the agent features and corridor features into the neural network 1700 and the neural network 1700 may output probabilities that the road agent will occupy each of the corridors one time step in the future (e.g., one second later).

Figure 18:
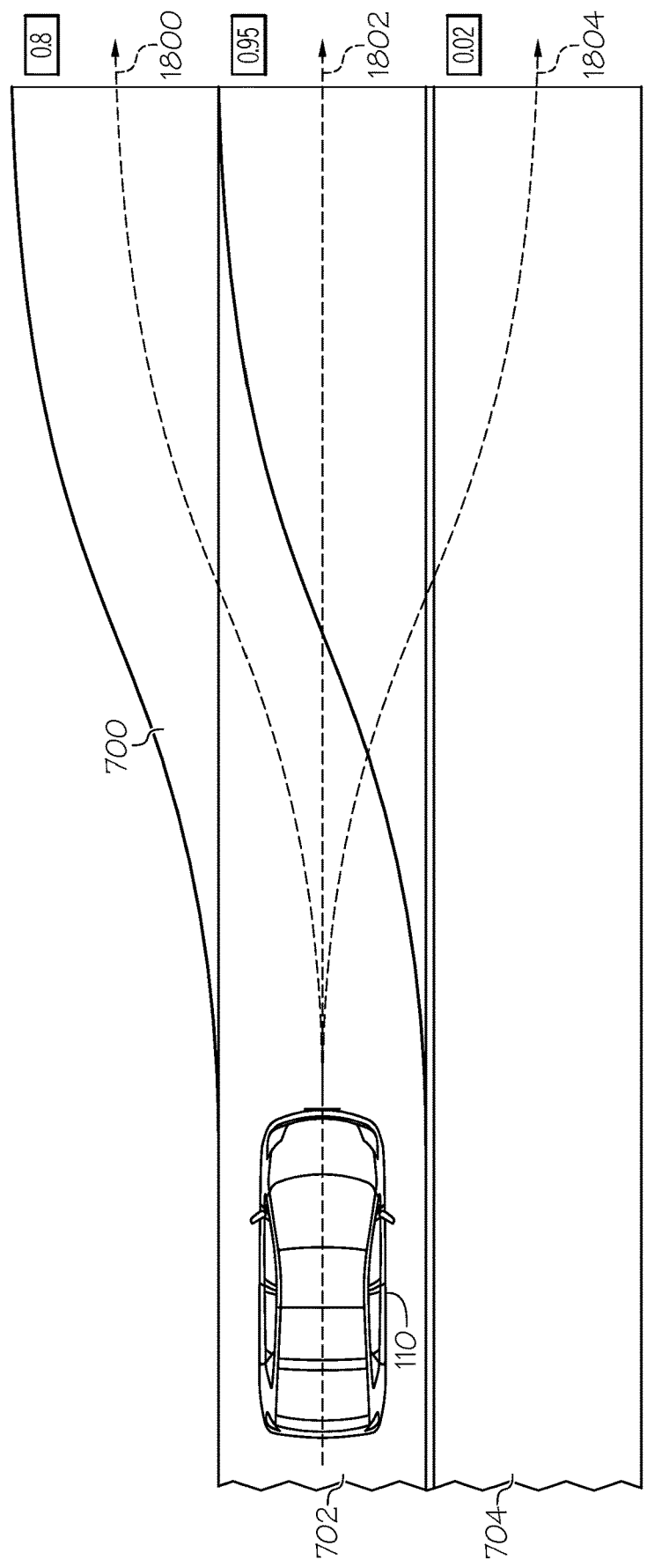
FIG. 18 depicts example trajectories of a vehicle along an example road portion, according to one or more embodiments shown and described herein.

Referring still to FIG. 3, the trajectory determination module 328 may determine possible trajectories of a road agent based on the corridors generated by the corridor generation module 316. Specifically, the trajectory determination module 328 may determine trajectories corresponding to each corridor generated by the corridor generation module 316 for a particular road portion. For example, FIG. 18 shows trajectories 1800, 1802, and 1804 that may be taken by vehicle 110 along corridors 700, 702, and 704, respectively. The trajectory determination module 328 may also assign a probability of a vehicle driving along each of the determined trajectories based on the output of the corridor prediction module 326. However, as explained above, the corridor prediction module 326 determines probabilities of a road agent being in a certain corridor one time step in the future (e.g., one second). Depending on the speed of the road agent, the road agent may only travel a small portion of a determined trajectory during that one time step. As such, because corridors may overlap, the probabilities of a road agent following different trajectories may not sum to one.

In the example of FIG. 18, the vehicle 110 has a 0.8 probability of following trajectory 1800 during the next time step, a 0.95 probability of following trajectory 1802 during the next time step, and a 0.02 probability of following trajectory 1804 during the next time step. However, because trajectories 1800 and 1802 partially overlap, these probabilities do not sum to one. Certain path planning algorithms work better when considering potential trajectories of a road agent that sum to one. As such, the probabilities output by the corridor prediction module 326 may be normalized using techniques described below.

Figure 19:
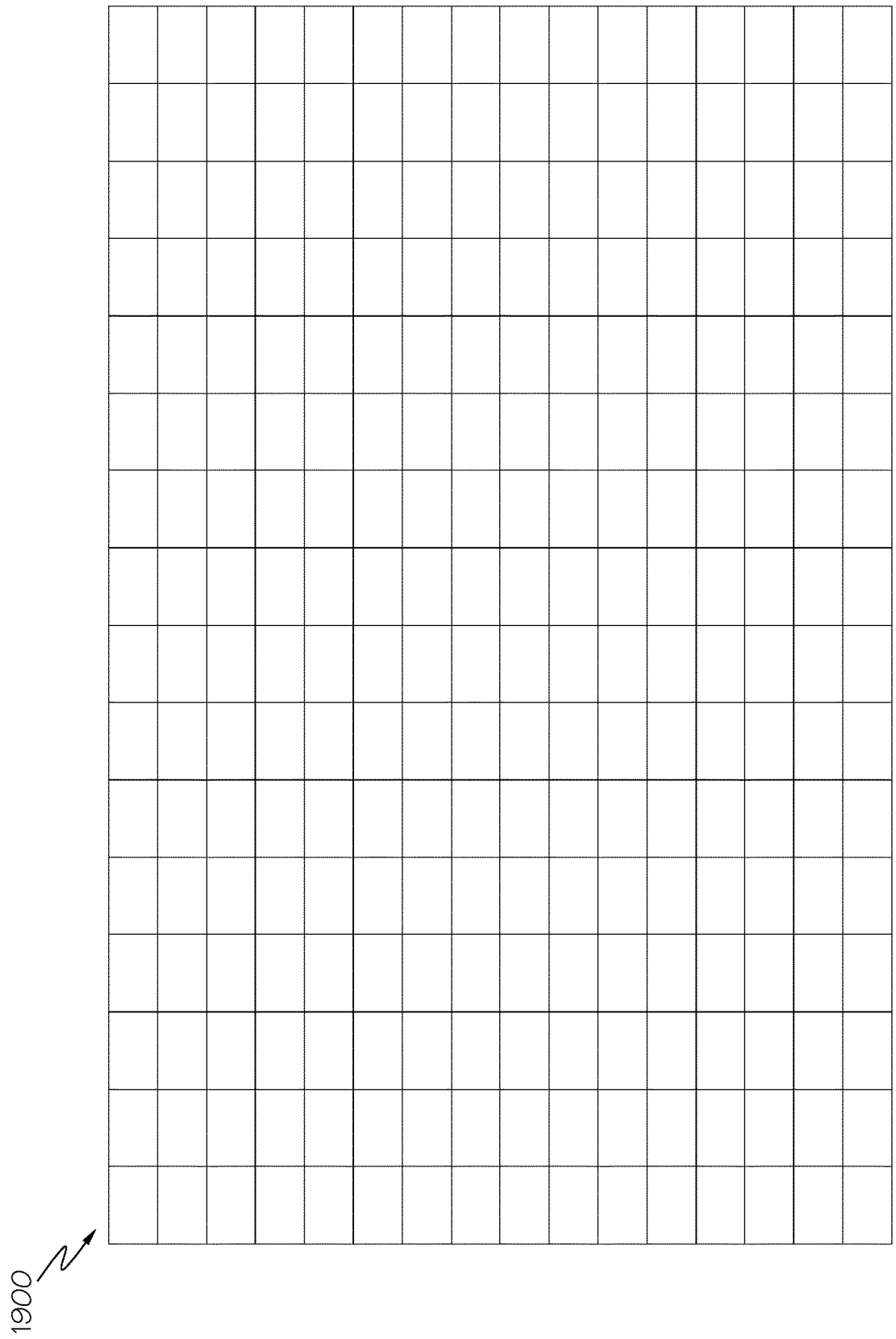
FIG. 19 depicts an example discretization of a road portion, according to one or more embodiments shown and described herein.

Referring back to FIG. 3, the data normalization module 330 may normalize the probabilities output by the corridor prediction module 326 such that the probabilities sum to one. A variety of techniques may be used to normalize these probabilities. In one example, the data normalization module 330 may discretize a road portion into a grid comprising a plurality of grid portions, as shown in FIG. 19. The data normalization module 330 may then normalize the probabilities of a road agent occupying each grid portion based on the trajectories determined by the trajectory determination module 328 and the probabilities output by the corridor prediction module 326. For example, as shown in FIG. 19, the data normalization module 330 may discretize a road portion 1900 into a two-dimensional grid comprising 16 rows and 16 columns, thereby comprising 256 grid portions.

Then, the data normalization module 330 may add all probabilities associated with corridors that overlap each grid portion.

Figure 20:
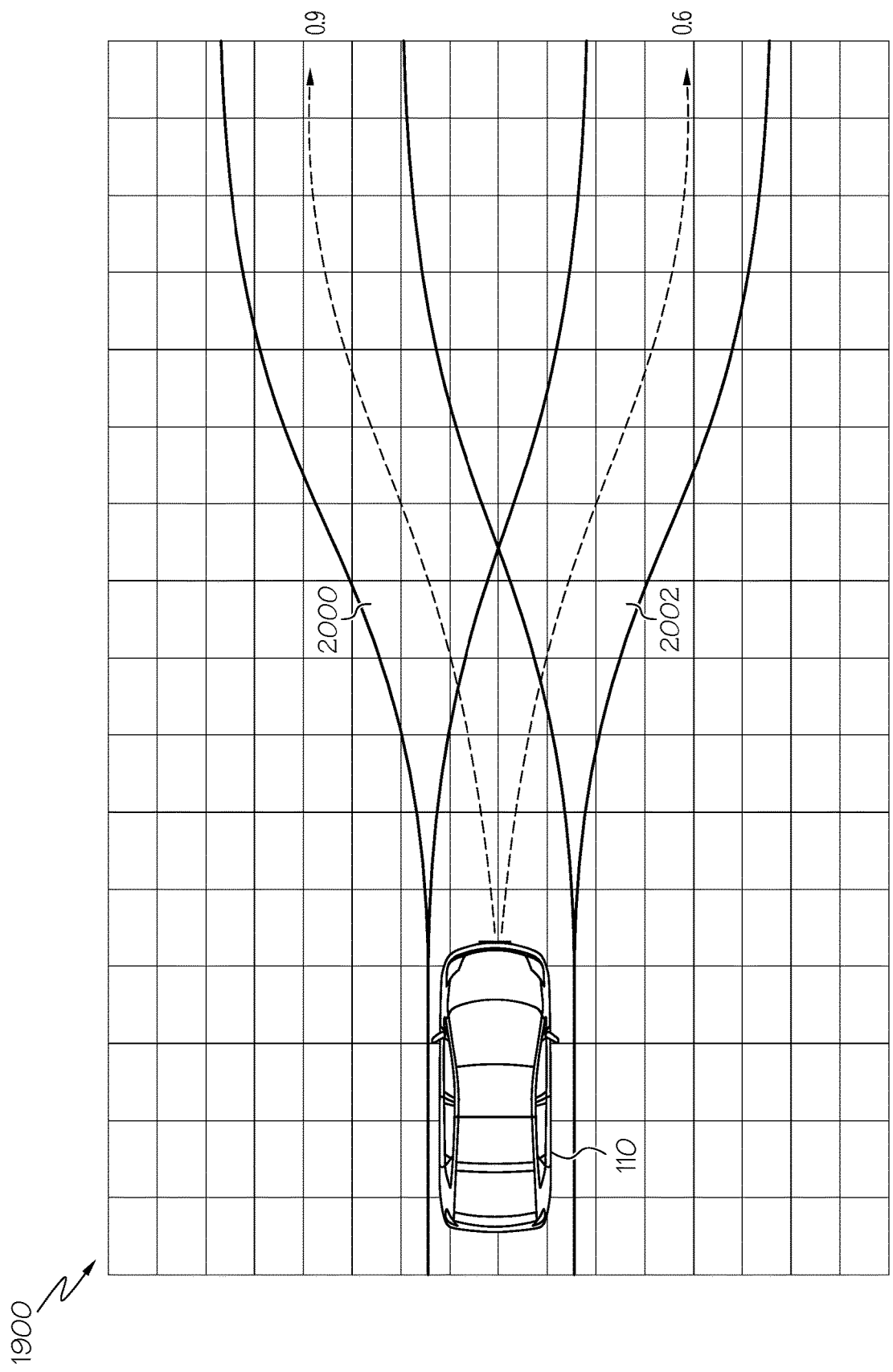
FIG. 20 shows example trajectories along which a vehicle may drive on a discretized road portion, according to one or more embodiments shown and described herein.

FIG. 20 shows the road portion 1900 having two examples corridors 2000 and 2002 along which the vehicle 110 may traverse. As shown in FIG. 20, the vehicle 110 has a 0.9 probability of following corridor 2000 during the next time step and a 0.6 probability of following corridor 2002 during the next time step. Because the corridors 2000 and 2002 partially overlap, these probabilities sum to a value greater than one. Disclosed herein is an exemplary method to normalize the probabilities such that they sum to one.

Figure 21:
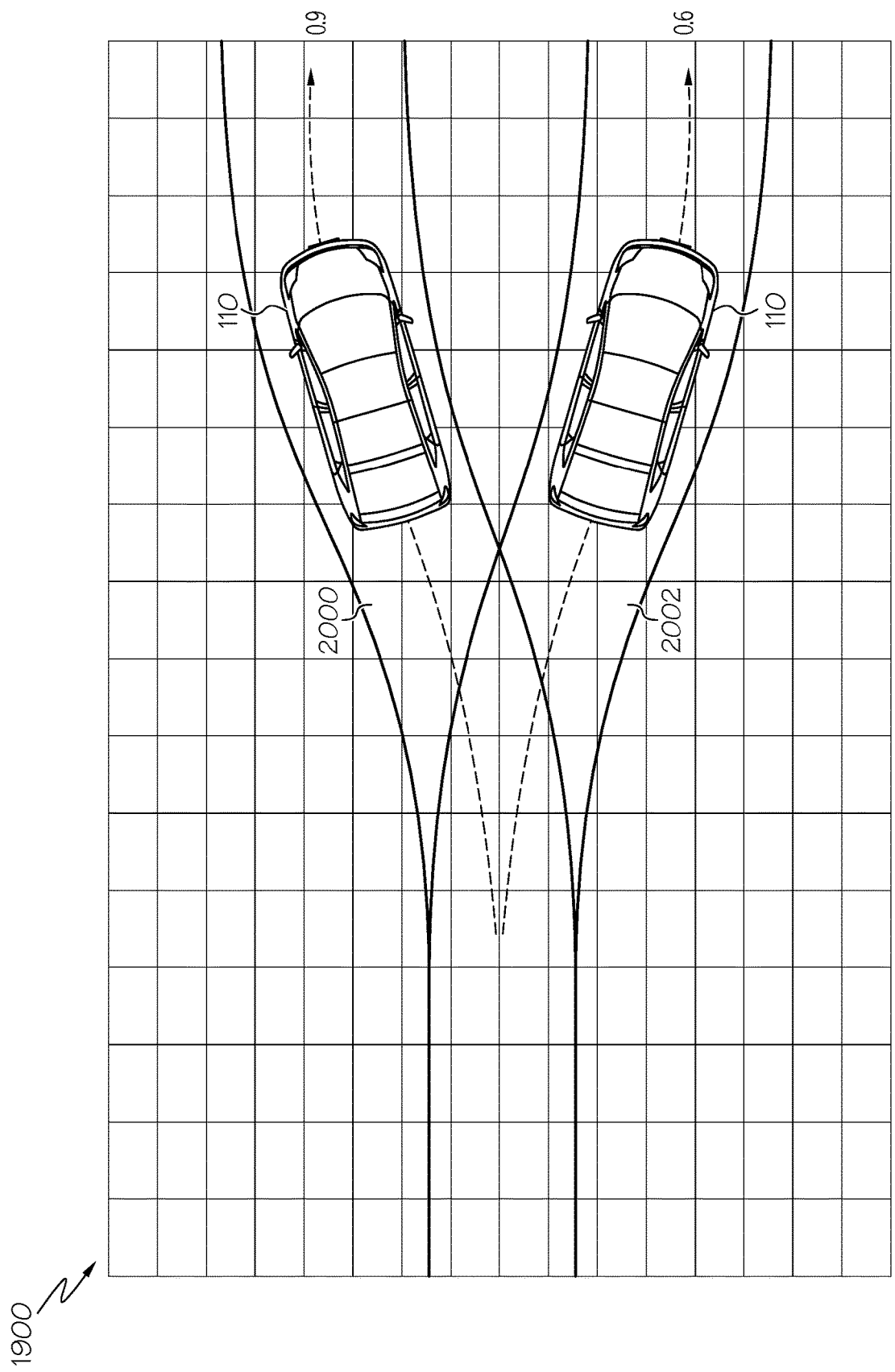
FIG. 21 shows possible positions of a vehicle traveling along the discretized road portion, according to one or more embodiments shown and described herein.
Figure 22:
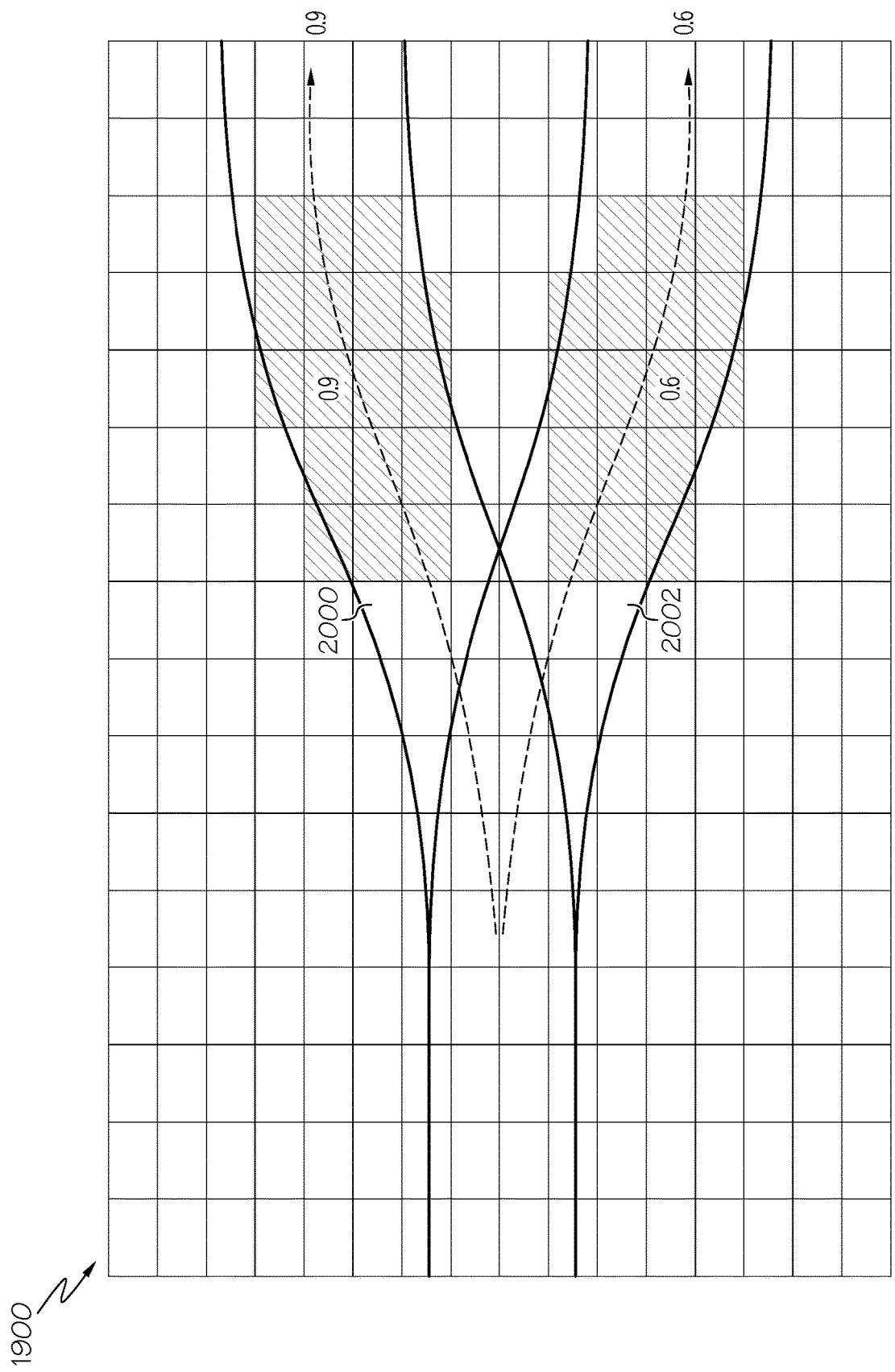
FIG. 22 shows example probability values for a vehicle traveling along the discretized road portion, according to one or more embodiments shown and described herein.

FIG. 21 shows two possible positions of the vehicle 110 at a future time step along the road portion 1900; one position when the vehicle 110 follows corridor 2000 and another position when the vehicle 110 follows corridor 2002. As shown in FIG. 21, the vehicle 110 has a 0.9 probability of following corridor 2000 and a 0.6 probability of following corridor 2002. As such, one method of normalizing the probabilities is to fill in each grid portion that is at least partially covered by the vehicle 110 in one of the two hypothetical paths. This is shown in FIG. 22, where several grid portions along corridor 2000 (i.e., the shaded grid portions that are at least partially covered by the vehicle 110 along corridor 200 in FIG. 21) are filled in with the value 0.9 and several grid portions along corridor 2002 (i.e., the shaded grid portions that are at least partially covered by the vehicle 110 along corridor 2002 in FIG. 21) are filled in with the value 0.6. Then, these two probability values can be summed and each of the probability values can be divided by the sum to obtain normalized probability values. In the example of FIG. 22, summing the probability values yields 0.9+0.6=1.5. Then, dividing the probability values by the sum yields 0.9/1.5=0.6 and 0.6/1.5=0.4. Thus, the probability of the vehicle being positioned in the shaded grid portions along corridor 2000 is 0.6 at the time step illustrated in the example of FIG. 22, and the probability of the vehicle being positioned in the shaded grid portions along corridor 2002 is 0.4 at the time step illustrated in the example of FIG. 22. As expected, these probability values sum to one.

Figure 23:
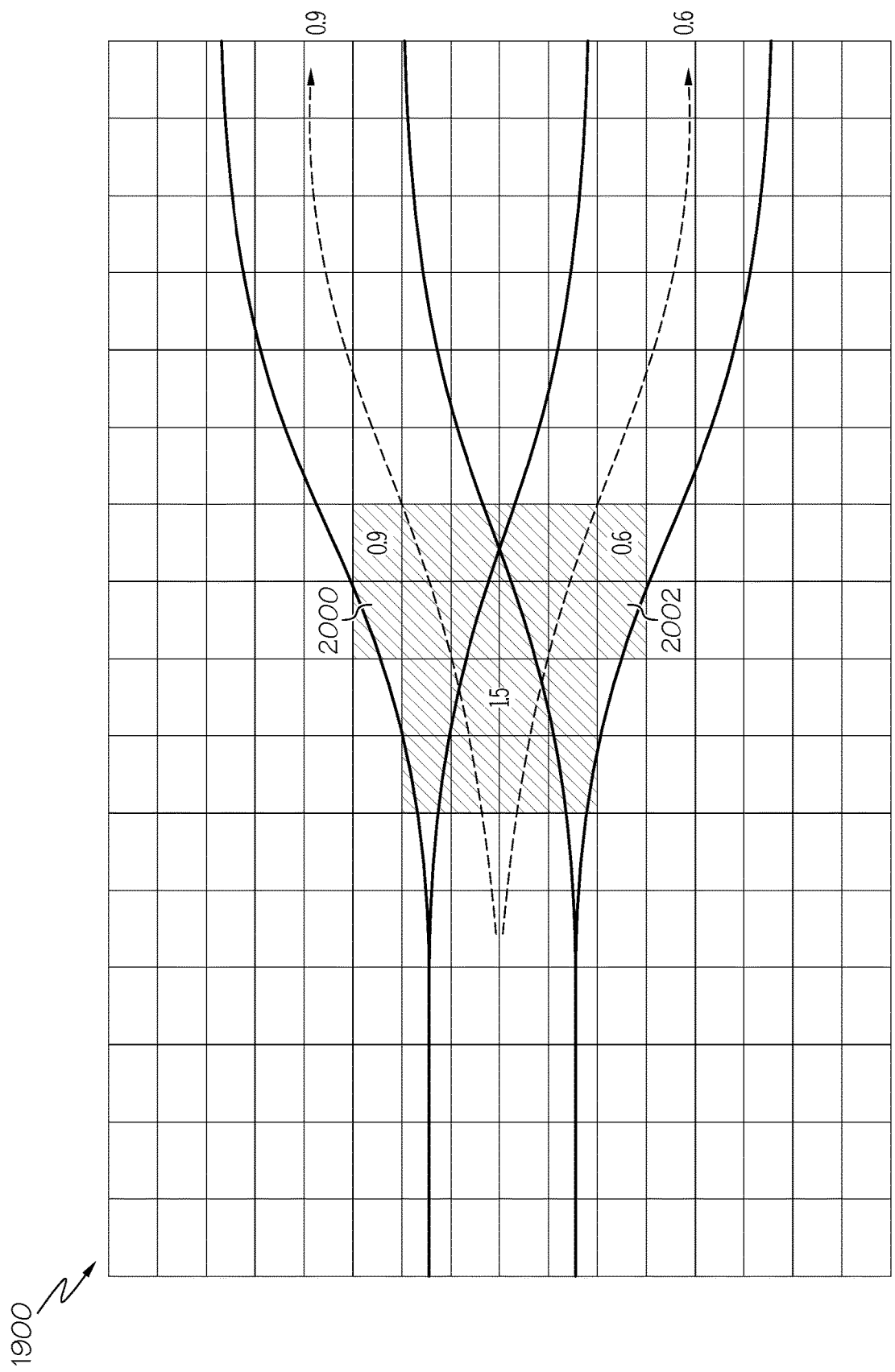
FIG. 23 shows other example probability values for a vehicle traveling along the discretized road portion, according to one or more embodiments shown and described herein.

FIG. 23 shows another example of the vehicle 110 traveling along the road portion 1900 at a different time step. In the example of FIG. 23, the vehicle 110 may advance along corridor 2000 or corridor 2002, in a similar manner as illustrated in FIGS. 21-22. However, in the example of FIG. 23, the vehicle has not advanced in the example of FIGS. 21-22. At the time step illustrated in the example of FIG. 23, when the vehicle 110 advances along corridor 2000, the vehicle 110 is positioned over certain grid portions. Likewise, when the vehicle 110 advances along corridor 2002, the vehicle is positioned over certain other grid portions. However, in the example of FIG. 23, some of the grid portions covered by the vehicle 110 when it travels along corridor 2000 are the same as the grid portions covered by the vehicle 110 when it travels along corridor 2002. Thus, the grid portions covered only by the vehicle 110 when traveling along corridor 200 are filled in with a value of 0.9, the grid portions covered only by the vehicle 110 when traveling along corridor 2002 are filled in with a value of 0.6, and the grid portions covered by the vehicle 110 when traveling along corridor 2000 and corridor 2002 are filled in with a value of 1.5 (i.e., 0.9+0.6). These values may then be summed to obtain 0.9+0.6+1.5=3. Then, each of these values may be divided by the same to obtain 0.9/3=0.3, 0.6/3=0.2, and 1.5/3=0.5. Thus, the probability of the vehicle 110 being positioned in one of the shaded regions labeled 0.9 is 0.3, the probability of the vehicle 110 being positioned in one of the shaded regions labeled 0.6 is 0.2, and the probability of the vehicle 110 being positioned in one of the shaded regions labeled 1.5 is 0.5.

The methods described with respect to FIGS. 19-23 illustrate one way of normalizing probability values. However, it should be understood that in other examples, other methods of normalizing probability values may be used.

Referring back to FIG. 3, the path planning module 332 may plan a path for the autonomous vehicle 102 based on the normalized probabilities determined by the data normalization module 330. That is, the path planning module 332 may determine a path for the autonomous vehicle 102 based on possible trajectories that another vehicle in the vicinity of the autonomous vehicle 102 (e.g., the vehicle 110) is likely to follow. Any known path planning algorithm may be used by the path planning module 332.

Figure 24:
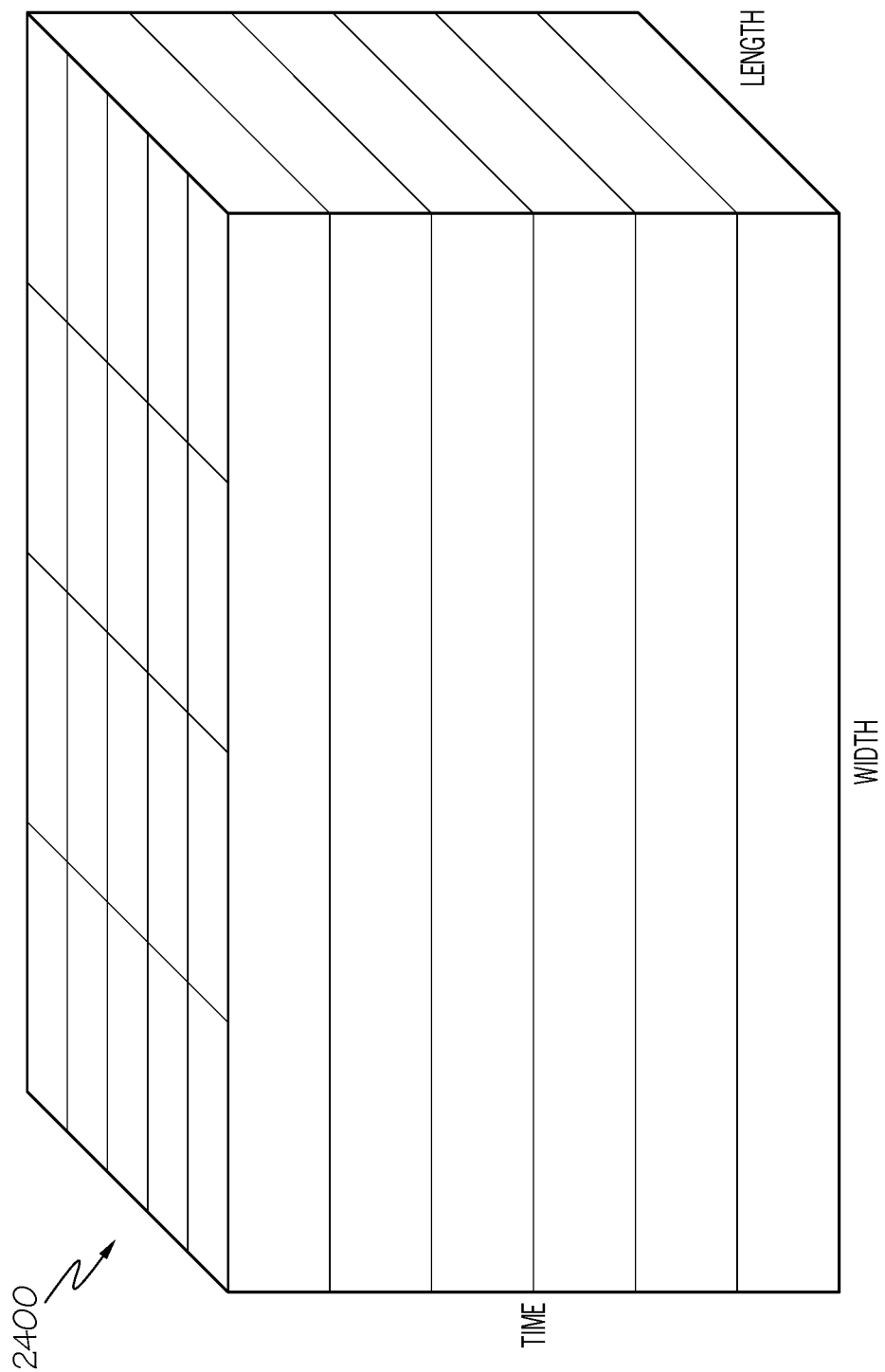
FIG. 24 shows an example three-dimensional discretization of a road portion, according to one or more embodiments shown and described herein.
Figure 25:
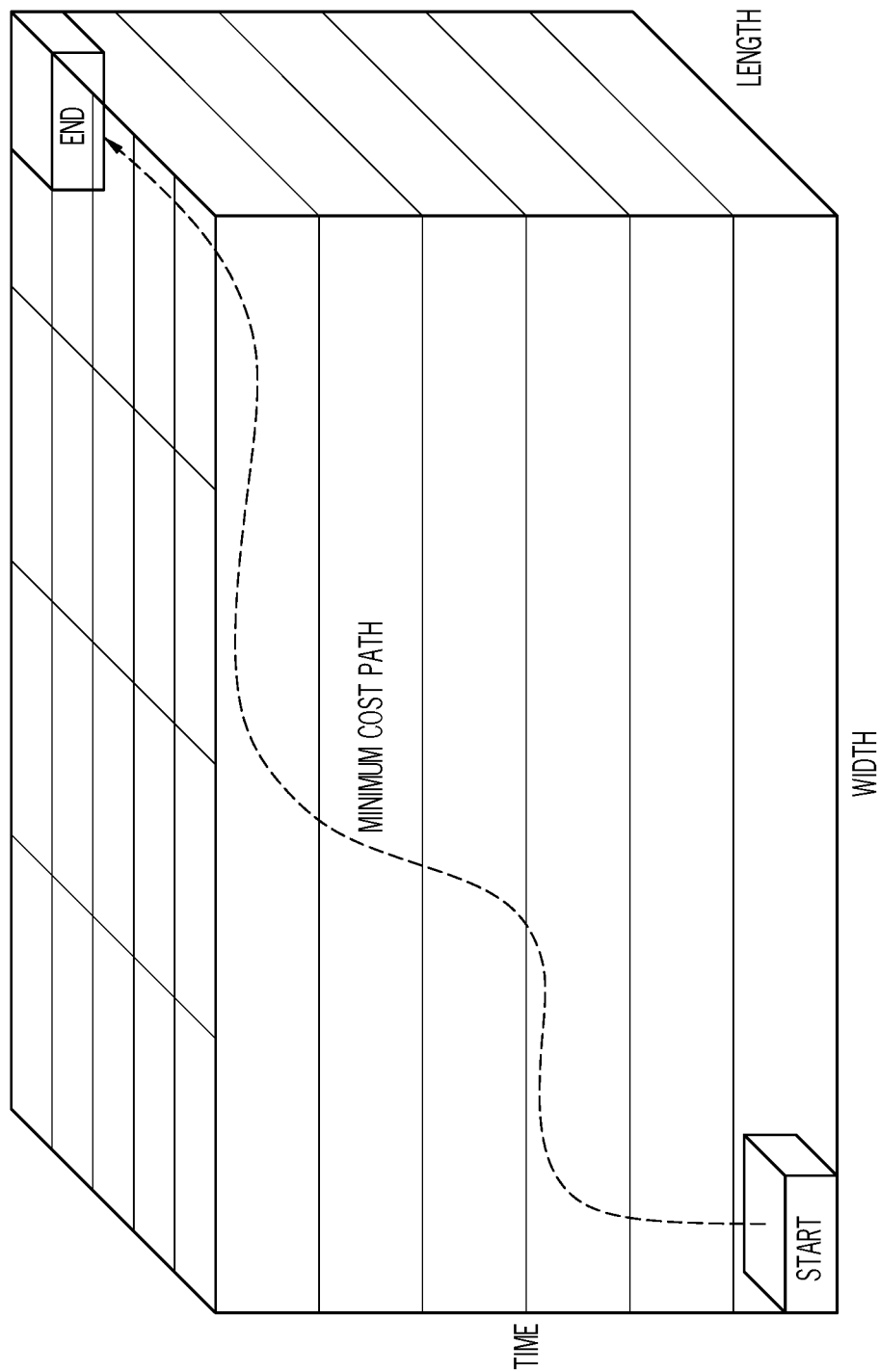
FIG. 25 shows a vehicle traveling along a three-dimensional discretization of a road portion, according to one or more embodiments shown and described herein.

In one example, the path planning module 332 may plan a path by creating a three-dimensional grid by stacking a plurality of two-dimensional grids representing probabilities of the vehicle 110 being positioned at different portions of the two-dimensional grid. Each two-dimensional grid may represent the probabilities of the vehicle 110 being at certain positions at different time steps. For example, the grid shown in FIG. 22, representing probabilities of the position of the vehicle 110 at one time step, may be stacked on top of the grid shown in FIG. 23, representing probabilities of the position of the vehicle 110 at an earlier time step. This may result in a three-dimensional grid 2400 as shown FIG. 24. In the example of FIG. 24, the three-dimensional grid 2400 comprises a stack of six two-dimensional grids, with each two-dimensional grid representing probabilities of positions of the vehicle 110 at different time steps. After creating a three-dimensional grid as discussed above, the path planning module 332 may find a path through the grid that traverses through the minimal amount of occupancy mass based on the predicted travel of the vehicle 110. An example path that may be determined by the path planning module 332 using the three-dimensional grid 2400 is shown in FIG. 25.

FIG. 4 depicts a flowchart of an example method for training the neural network 1700 of FIG. 17, according to one or more embodiments shown and described herein. At step 400, the map generation module 312 receives map data associated with one or more road portions occupied by one or more vehicles. For each road portion, the map generation module 312 may generate a graph comprising a plurality of nodes and edges representing possible paths for road agents to traverse along the road portion. For each road portion, the map generation module 312 may generate a different graph for different types of road agents.

At step 402, the road agent tracking module 314 receives sensor data associated with one or more road agents. The road agent tracking module 314 may identify the one or more road agents and track their positions over time based on the received sensor data.

At step 404, the corridor generation module 316 defines one or more corridors for one or more road portions based on the map data received by the map generation module 312. Different corridors may be defined for different types of road agents. In one example, the corridor generation module 316 defines corridors by performing a breadth first search across the nodes of graphs generated by the map generation module 312.

At step 406, the agent feature extraction module 318 extracts agent features based on the sensor data received by the road agent tracking module 314. The agent features may represent features of road agents tracked by the road agent tracking module 314.

At step 408, the corridor feature extraction module 320 extracts corridor features based on the sensor data received by the road agent tracking module 314 and the corridors defined by the corridor generation module 316. The corridor features may represent a relationship between a road agent and a corridor.

At step 410, the data labeling module 322 labels data for training examples. For a particular training example, the data labeling module 322 creates a label for each corridor associated with a road portion. The label may indicate whether a road agent occupies a corridor at a first time associated with a first set of agent features and corridor features, and whether the road agent occupies the corridor at second time, one time step later. Then, at step 412, the neural network training module 324 trains the neural network 1700 using a training data set comprising training examples labeled by the data labeling module 322.

FIG. 5 depicts a flowchart of an example method for using the trained neural network 1700 to predict the behavior of a road agent. For example, the method of FIG. 5 may be used to predict the behavior of vehicle 110 as it drives along road portion 106 in the example of FIG. 1. However, it should be understood that the method of FIG. 5 may be used in other situations as well.

At step 500, the map generation module 312 receives map data associated with the road portion 106. The map generation module 312 may generate a graph comprising a plurality of nodes and edges representing possible paths for the vehicle 110.

At step 502, the remote computing device 104 receives sensor data from the autonomous vehicle 102. The sensor data may be data captured by the vehicle sensors 210 related to the vehicle 110. The sensor data may be stored in the database 310.

At step 504, the corridor generation module 316 defines one or more corridors for the road portion 106 based on the map data received by the received map data and sensor data. The corridor generation module 316 may define the corridors by performing a breadth first search of the graph generated by the map generation module 312.

At step 506, the agent feature extraction module 318 extracts agent features associated with the vehicle 110 based on the received sensor data. At step 508, the corridor feature extraction module 320 extracts corridor features associated with the corridors generated by the corridor generation module 316 based on the received sensor data.

At step 510, the corridor prediction module 326 inputs the agent features and corridor features extracted by the agent feature extraction module 318 and the corridor feature extraction module 320, respectively, into the trained neural network 1700. Then at step 512, the corridor prediction module 326 predicts the behavior of the vehicle 110 based on the output of the neural network 1700. The path planning module 332 may then plan a path for the autonomous vehicle 102 based on the predicted behavior of the vehicle 110.

It should now be understood that embodiments described herein are directed to systems and methods for making corridor intent predictions. Maps of road portions are broken up into one or more corridors according to a set of rules to represent paths that different types of road agents are likely to follow. Sensor data is then used to track road agents over time. Agent features associated with the road agents and corridor features describing a relationship between the road agents and the corridors may then be extracted from the sensor data. A set of agent features and corridor features describing a state of a road agent at a particular time may be labeled based on the future movement of the road agent over a short time period to create a training example. A plurality of training examples may form a training data set that may be used to train a neural network. The neural network may be used to predict the movement of a road agent based on associated agent features and corridor features.

Once the neural network is trained, it may be used to make real-time predictions of road agent behavior. Specifically, an autonomous vehicle may collect sensor data associated with a road agent positioned on a road portion at a particular time. A map of the road portion may be used to generate corridors based on the type of road agent. Agent features relating to the road agent and corridor features describing a relationship between the road agent and the corridors may be extracted from the sensor data. The agent and corridor features may then be input into the trained neural network and the neural network may output predictions regarding the future movement of the road agent. This may then be input into a path planning algorithm to plan movement of the autonomous vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
 generating a training data set comprising a plurality of training examples, wherein each training example is generated by:
  receiving map data associated with a road portion;
  generating a graph associated with the road portion based on the map data, the graph having a plurality of nodes and edges, with each node representing a segment of the road portion and each edge representing a potential path of a road agent;
  receiving sensor data associated with a first road agent located on the road portion;
  defining one or more corridors associated with the road portion, each corridor comprising a series of connected nodes of the graph based on the map data and the sensor data;
  extracting a plurality of agent features associated with the first road agent based on the sensor data;
  extracting a plurality of corridor features associated with each of the one or more corridors based on the sensor data; and
  for each corridor, labeling the training example based on positions of the first road agent with respect to the corridor; and
 training a neural network to predict road agent behavior, using the training data set.

2. The method of claim 1, wherein defining the one or more corridors comprises performing a breadth first search through the graph between nodes and connected edges.

3. The method of claim 1, further comprising generating the plurality of nodes of the graph based on one or more heuristic rules.

4. The method of claim 1, wherein the plurality of corridor features describe a relationship between the first road agent and the one or more corridors.

5. The method of claim 1, further comprising, for each corridor, labeling the training example based on whether a first position of the first road agent is within the corridor at a first time and whether a second position of the first road agent is within the corridor at a second time after the first time.

6. The method of claim 1, wherein training the neural network comprises:
inputting the plurality of agent features into a recurrent neural network;
inputting an output of the recurrent neural network and the corridor features into classifier networks; and
training parameters of the neural network and the classifier networks based on the labeling of the plurality of training examples.

7. The method of claim 1, further comprising, for each corridor, training the neural network to predict probabilities that a position of the first road agent will be in the corridor at a second time, wherein the sensor data is associated with the road portion and the first road agent at a first time before the second time.

8. A method comprising:
receiving map data associated with a road portion;
generating a graph associated with the road portion based on the map data, the graph having a plurality of nodes and edges with each node representing a segment of the road portion and each edge representing a potential path of a road agent;
receiving sensor data associated with a first road agent located on the road portion;
defining one or more corridors associated with the road portion, each corridor comprising a series of connected nodes of the graph based on the map data and the sensor data;
extracting a plurality of agent features associated with the first road agent based on the sensor data;
extracting a plurality of corridor features associated with each of the one or more corridors based on the sensor data;
inputting the plurality of agent features and the plurality of corridor features into a trained neural network;
predicting behavior of the first road agent based on an output of the trained neural network; and
adjusting driving behavior of an autonomous vehicle based on the predicted behavior of the first road agent.

9. The method of claim 8, further comprising determining a probability that the first road agent will perform a lane change based on the output of the neural network.

10. The method of claim 8, further comprising, for each of the one or more corridors, determining a probability that a position of the first road agent will be in the corridor at a second time based on the output of the neural network, wherein the sensor data is associated with the road portion and the first road agent at a first time before the second time.

11. The method of claim 8, further comprising:
determining possible trajectories of the first road agent based on the one or more corridors; and
determining probabilities that the first road agent will follow each of the possible trajectories based on the output of the neural network.

12. The method of claim 11, further comprising normalizing the probabilities that the first road agent will follow each of the possible trajectories.

13. The method of claim 12, further comprising:
discretizing the road portion into a grid comprising a plurality of grid portions; and
determining normalized probabilities that the first road agent will occupy each of the grid portions based on the possible trajectories and the probabilities that the first road agent will follow each of the possible trajectories.

14. The method of claim 13, further comprising:
performing path planning for an autonomous vehicle based on the normalized probabilities.

15. A computing device comprising:
one or more processors;
one or more memory modules; and
machine readable instructions stored in the one or more memory modules that, when executed by the one or more processors, cause the computing device to:
generate a training data set comprising a plurality of training examples, wherein each training example is generated by:
receiving map data associated with a road portion;
generating a graph associated with the road portion based on the map data the graph having a plurality of nodes and edges, with each node representing a segment of the road portion and each edge representing a potential path of a road agent;
receiving sensor data associated with a first road agent located on the road portion;
defining one or more corridors associated with the road portion, each corridor comprising a series of connected nodes of the graph based on the map data and the sensor data;
extracting a plurality of agent features associated with the first road agent based on the sensor data;
extracting a plurality of corridor features associated with each of the one or more corridors based on the sensor data, and
for each corridor, labeling the training example based on a position of the first road agent with respect to the corridor; and
train a neural network to predict road agent behavior using the training data set.

16. The computing device of claim 15, wherein defining the one or more corridors comprises performing a breadth first search through the graph and connecting adjacent nodes with edges.

17. The computing device of claim 15, wherein the machine readable instructions stored in the one or more memory modules, when executed by the one or more processors, further cause the computing device to, for each corridor, label the training example based on whether the position of the first road agent is within the corridor at a first time and whether the position of the first road agent is within the corridor at a second time after the first time.

18. The computing device of claim 17, wherein the machine readable instructions stored in the one or more memory modules, when executed by the one or more processors, further cause the computing device to:
receive second map data associated with a second road portion;
receive second sensor data associated with a second road agent located on the second road portion at a third time;
define one or more second corridors associated with the second road portion based on the second map data and the second sensor data;

extract a plurality of second agent features associated with the second road agent based on the second sensor data;

extract a plurality of second corridor features associated with each of the one or more second corridors based on the sensor data;

input the plurality of second agent features and the plurality of second corridor features into the neural network; and predict behavior of the second road agent based on an output of the neural network.

19. The computing device of claim 18, wherein the machine readable instructions stored in the one or more memory modules, when executed by the one or more processors, further cause the computing device to:

determine possible trajectories of the second road agent based on the one or more second corridors; and determine probabilities that the second road agent will follow each of the possible trajectories based on the output of the neural network.

20. The computing device of claim 19, wherein the machine readable instructions stored in the one or more memory modules, when executed by the one or more processors, further cause the computing device to normalize the probabilities that the second road agent will follow each of the possible trajectories.

* * * * *

UNITED STATES PATENT AND TRADEMARK OFFICE
CERTIFICATE OF CORRECTION

| | |
|---|---|
| PATENT NO. | : 11,783,178 B2 |
| APPLICATION NO. | : 16/942892 |
| DATED | : October 10, 2023 |
| INVENTOR(S) | : Blake Warren Wulfe and Wolfram Burgard |

Page 1 of 1

It is certified that error appears in the above-identified patent and that said Letters Patent is hereby corrected as shown below:

In the Specification

In Column 13, Line(s) 54, delete "computer" and insert --compute--, therefor.

In the Claims

In Column 20, Line(s) 25, Claim 15, after "data", insert --,--.

In Column 20, Line(s) 39, Claim 15, after "data", delete "," and insert --;--, therefor.

Signed and Sealed this
First Day of October, 2024

Katherine Kelly Vidal
*Director of the United States Patent and Trademark Office*